US012572227B2

(12) United States Patent
Lu et al.

(10) Patent No.: US 12,572,227 B2
(45) Date of Patent: Mar. 10, 2026

(54) STYLUS WITH ADJUSTABLE FEATURES

(71) Applicant: Apple Inc., Cupertino, CA (US)

(72) Inventors: Jean Hsiang-Chun Lu, Sunnyvale, CA (US); Jacob L. Matlick, San Francisco, CA (US); Wesley W. Zuber, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/410,893

(22) Filed: Jan. 11, 2024

(65) Prior Publication Data

US 2025/0110588 A1      Apr. 3, 2025

Related U.S. Application Data

(60) Provisional application No. 63/541,270, filed on Sep. 28, 2023.

(51) Int. Cl.
*G06F 3/0354* (2013.01)
*G06F 3/01* (2006.01)
(52) U.S. Cl.
CPC .......... *G06F 3/03546* (2013.01); *G06F 3/016* (2013.01)

(58) Field of Classification Search
CPC .. G06F 3/03546; G06F 3/016; G06F 3/03545; G06F 3/033
See application file for complete search history.

(56) References Cited

U.S. PATENT DOCUMENTS

| | | | |
|---|---|---|---|
| 2014/0078109 A1* | 3/2014 | Armstrong-Muntner | ................... G06F 3/03542 345/173 |
| 2017/0068339 A1 | 3/2017 | Zimmerman et al. | |
| 2018/0081456 A1 | 3/2018 | Li et al. | |
| 2019/0064936 A1 | 2/2019 | Wang | |
| 2019/0324561 A1 | 10/2019 | Anderson et al. | |
| 2019/0384402 A1 | 12/2019 | Huizar et al. | |
| 2020/0089340 A1 | 3/2020 | Ruscher et al. | |

* cited by examiner

*Primary Examiner* — Dennis P Joseph
(74) *Attorney, Agent, or Firm* — BAKERHOSTETLER

(57) ABSTRACT

An input device, such as a stylus, can include adjustment capabilities that changes a size, shape, stiffness, or other characteristics of a portion of the stylus, such as the tip. The size, shape, stiffness, or other characteristics of a tip of the stylus can be altered to mimic characteristics of a particular writing or drawing tool. For example, the stiffness at the tip, the weight distribution, and/or moment of inertia of a particular tool can be simulated by altering the features of the stylus.

10 Claims, 11 Drawing Sheets

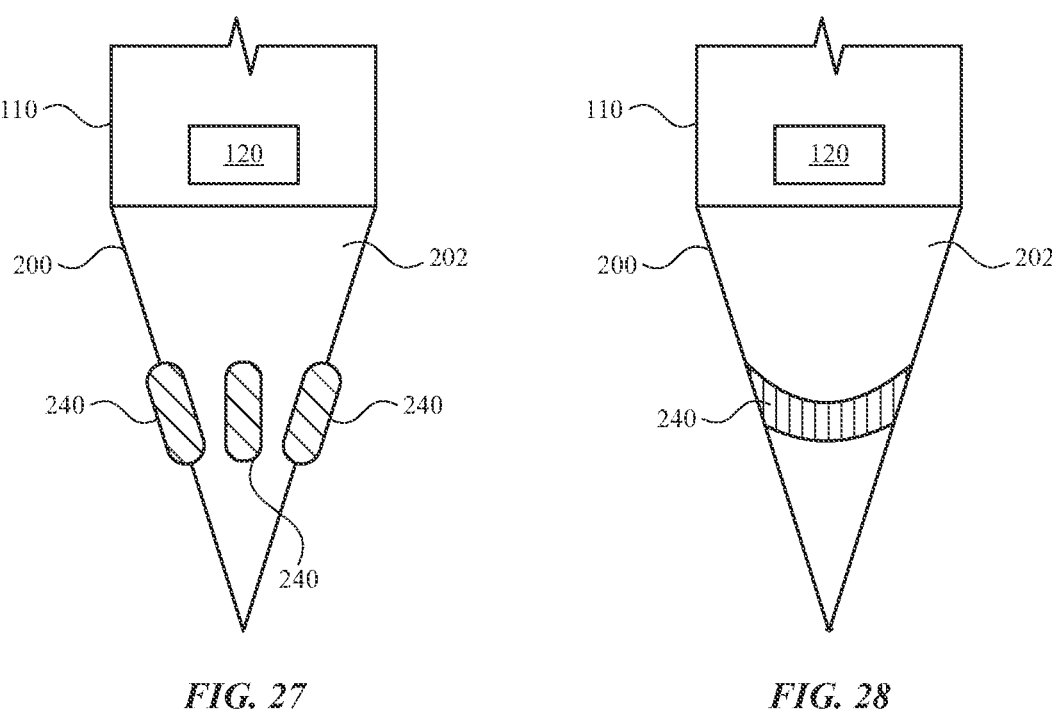
*FIG. 27*              *FIG. 28*
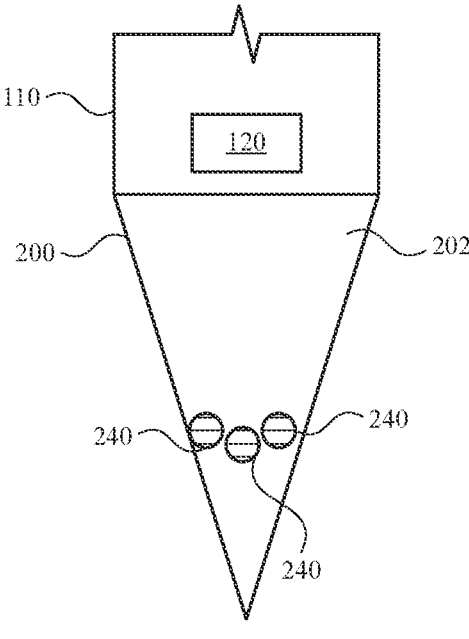
*FIG. 29*

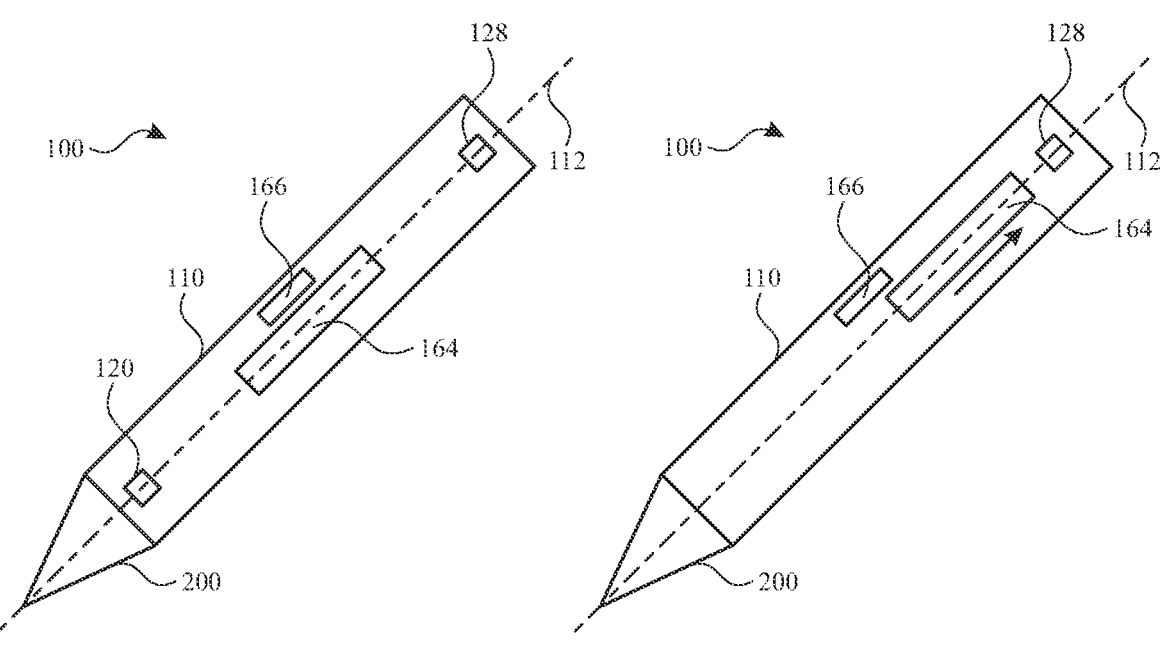
*FIG. 30*             *FIG. 31*
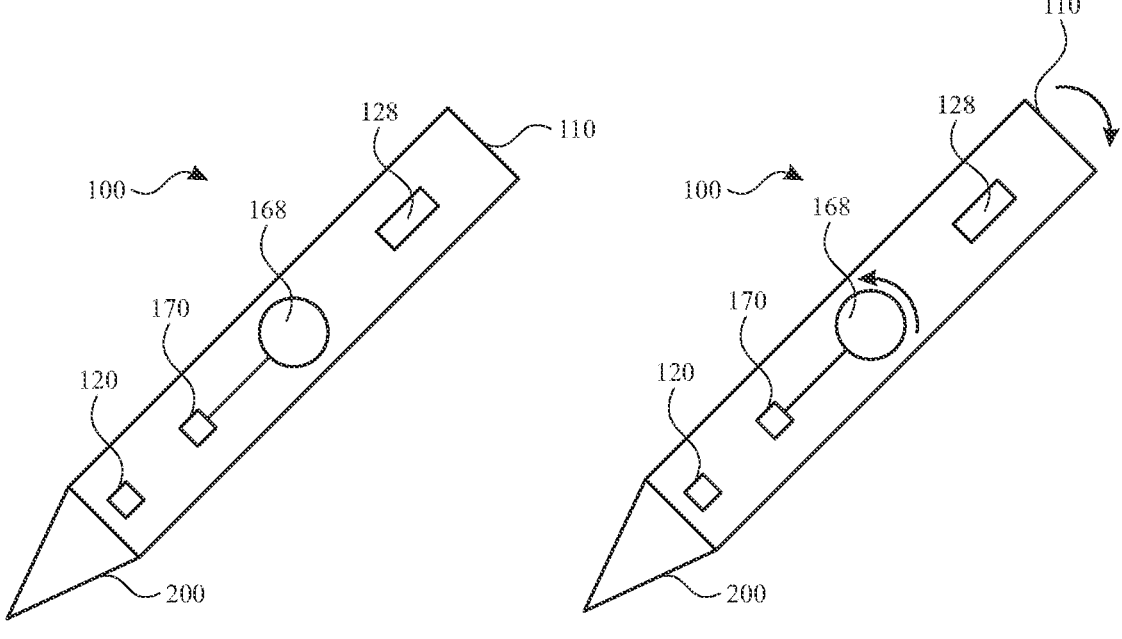
*FIG. 32*             *FIG. 33*

STYLUS WITH ADJUSTABLE FEATURES

CROSS-REFERENCE TO RELATED APPLICATION

This application claims the benefit of U.S. Provisional Application No. 63/541,270, entitled "STYLUS WITH ADJUSTABLE FEATURES," filed Sep. 28, 2023, the entirety of which is incorporated herein by reference.

TECHNICAL FIELD

The present description relates generally to handheld devices, such as styluses, and, more particularly, to touch-based input devices that can provide adaptive feedback to a user.

BACKGROUND

A variety of handheld input devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

FIG. 27 illustrates a side view of a portion of a stylus, according to some embodiments of the subject technology.

FIG. 28 illustrates a side view of a portion of a stylus, according to some embodiments of the subject technology.

FIG. 29 illustrates a side view of a portion of a stylus, according to some embodiments of the subject technology.

FIG. 30 illustrates a side view of a stylus, according to some embodiments of the subject technology.

FIG. 31 illustrates a side view of the stylus of FIG. 30, according to some embodiments of the subject technology.

FIG. 32 illustrates a side view of a stylus, according to some embodiments of the subject technology.

FIG. 33 illustrates a side view of the stylus of FIG. 32, according to some embodiments of the subject technology.

DETAILED DESCRIPTION

Figure 1:
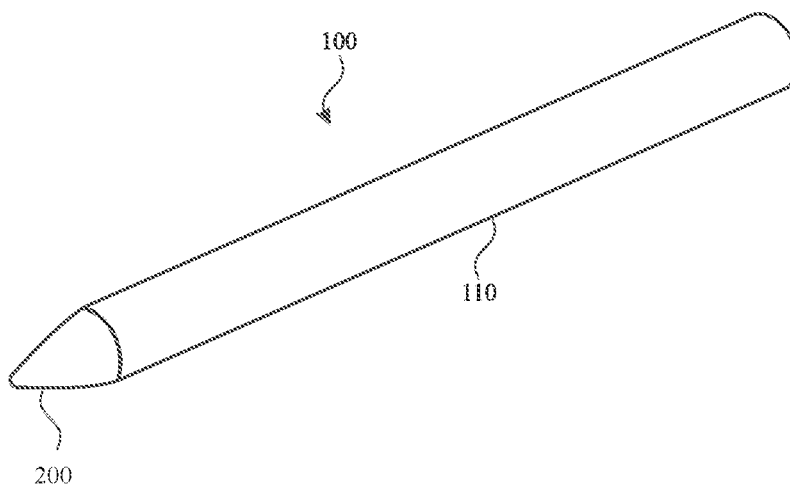
FIG. 1 illustrates a perspective view of a stylus, according to some embodiments of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a display surface and/or a touch panel receive tactile input from a user. A touch-based input device can be operated by a user to provide inputs to such an electronic device. Such interactions can simulate the experience of writing or drawing on a surface (e.g., paper, canvas, etc.) with a writing or drawing tool (e.g., pen, pencil, chalk, marker, or paintbrush). It can be desirable to closely replicate the experience of operating such tools so that the user has an experience that is familiar.

A handheld input device in accordance with embodiments disclosed herein can include any device that is held, worn, or contacted by a user for receiving inputs from the user. In an exemplary embodiment, an electronic stylus is used to provide inputs to an external device. The user manipulates the orientation and position of the stylus relative to an interface surface of the external device to convey information to the external device such as, but not limited to, writing, sketching, scrolling, gaming, selecting user interface elements, moving user interface elements, and so on.

The size and/or shape of portions of the stylus (e.g., the tip) can be altered during use thereof to accommodate a user. For example, the size and/or shape of a tip of the stylus can be altered to mimic characteristics of a writing or drawing tool (e.g., pen, pencil, chalk, marker, or paintbrush). Such characteristics can include shape, stiffness, flexibility, friction, and the like. Other characteristics, such as multiple bristles, center of gravity, and rotational moment of inertia, can also be modified as desired.

These and other embodiments are discussed below with reference to FIGS. 1-33. However, those skilled in the art will readily appreciate that the detailed description given herein with respect to these figures is for explanatory purposes only and should not be construed as limiting.

A touch-based input device in accordance with embodiments disclosed herein can include any device that is held, worn, or contacted by a user for providing input and/or receiving feedback. An example of a touch-based input device is a stylus, such as a stylus having one or more electronic components for performing functions during operation by a user.

As shown in FIG. 1, a stylus 100 can support handling and operation by a user. In particular, stylus 100 can receive inputs from a user and detect such inputs at tip 200. According to some embodiments, for example as illustrated in FIG. 1, stylus 100 can include a housing 110 that provides an outermost cover along at least a portion of the length of stylus 100. A user can grip stylus 100 at a user grip region along a portion of housing 110 during use of stylus 100. Housing 110 can define an outermost surface along a portion of stylus 100.

Initially, reference is made to certain physical and operational characteristics of stylus 100. Stylus 100 may take various forms to facilitate use and manipulation by the user. As shown in FIG. 1, stylus 100 has the general form of a writing instrument such as a pen or a pencil. In the illustrated embodiment, housing 110 can define two end portions that define longitudinal ends of stylus 100. Housing 110 can define at least half of a total length of stylus 100. In this example, one end of housing 110 are terminated with tip 200. Either end of housing 110 (e.g., tip 200) can be removable, affixed to housing 110, or an integral part of housing 110.

Stylus 100 can include tip 200 for contacting a surface. Stylus 100 can include one or more sensors that detect when tip 200 contacts and applies a force or pressure to the surface. Such sensors can include one or more contact sensors, capacitive sensors, touch sensors, cameras, piezoelectric sensors, pressure sensors, proximity sensors, electric field sensors, photodiodes, and/or other sensors operable to detect contact with the surface. Tip 200 can have one or more of a variety of shapes, dimensions, and/or other features to provide desired aspects of an interaction between stylus 100 and a surface, as described further herein.

As illustrated in FIG. 1, tip 200 can form a particular shape at a terminal end of stylus 100. Although illustrated in FIG. 1 as a cone, tip 200 need not take a conical or frustoconical shape in all embodiments. Tip 200, or portions thereof, can exhibit a constant or adjustable size and/or shape, as discussed further herein.

Figure 2:
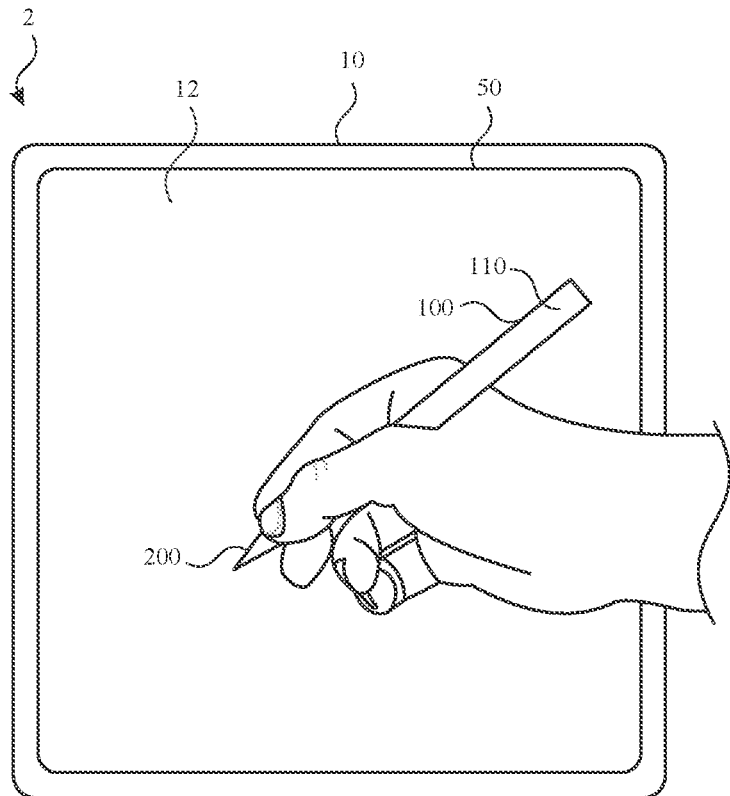
FIG. 2 illustrates a view of a system including the stylus of FIG. 1 and an external device, according to some embodiments of the subject technology.

The touch-based input device can be used alone or in conjunction with another device. For example, FIG. 2 illustrates a system 2 including stylus 100 and an external device 10 having a surface 12, according to some embodiments of the subject technology. Stylus 100 can be held by a user and operated as a touch-based input device for use with external device 10.

Stylus 100 can be operated to contact surface 12 of external device 10 with tip 200. Such contact can be detected by external device 10 and/or stylus 100. For example, stylus 100 can include one or more sensors that detect when tip 200 contacts and applied pressure to surface 12. In some embodiments, the sensors can optionally operate cooperatively with external device 10 to detect contact with surface 12.

Surface 12 of external device 10 can include, overlap, and/or be part of a display 50 and/or a touch panel for interacting with stylus 100 when contacted thereby. External device 10 can operate display 50 to render images to convey information to the user. Display 50 can be configured to show text, colors, line drawings, photographs, animations, video, and the like. Surface 12 of external device 10 can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types. One or more implementations can include devices that function as both input and output devices, such as a touchscreen. For example, display 50 can be configured for receiving user inputs, such as tap inputs and swipe inputs. Surface 12 can be a touch-sensitive surface that detects touch inputs from a user (e.g., with a finger) and/or from stylus 100 (e.g., with tip 200). In some examples, display 50 and the touch-sensitive surface 12 form a touch-sensitive display. Touch-sensitive surface 12 and/or another component can form a user interface for interaction by a user.

Figure 3:
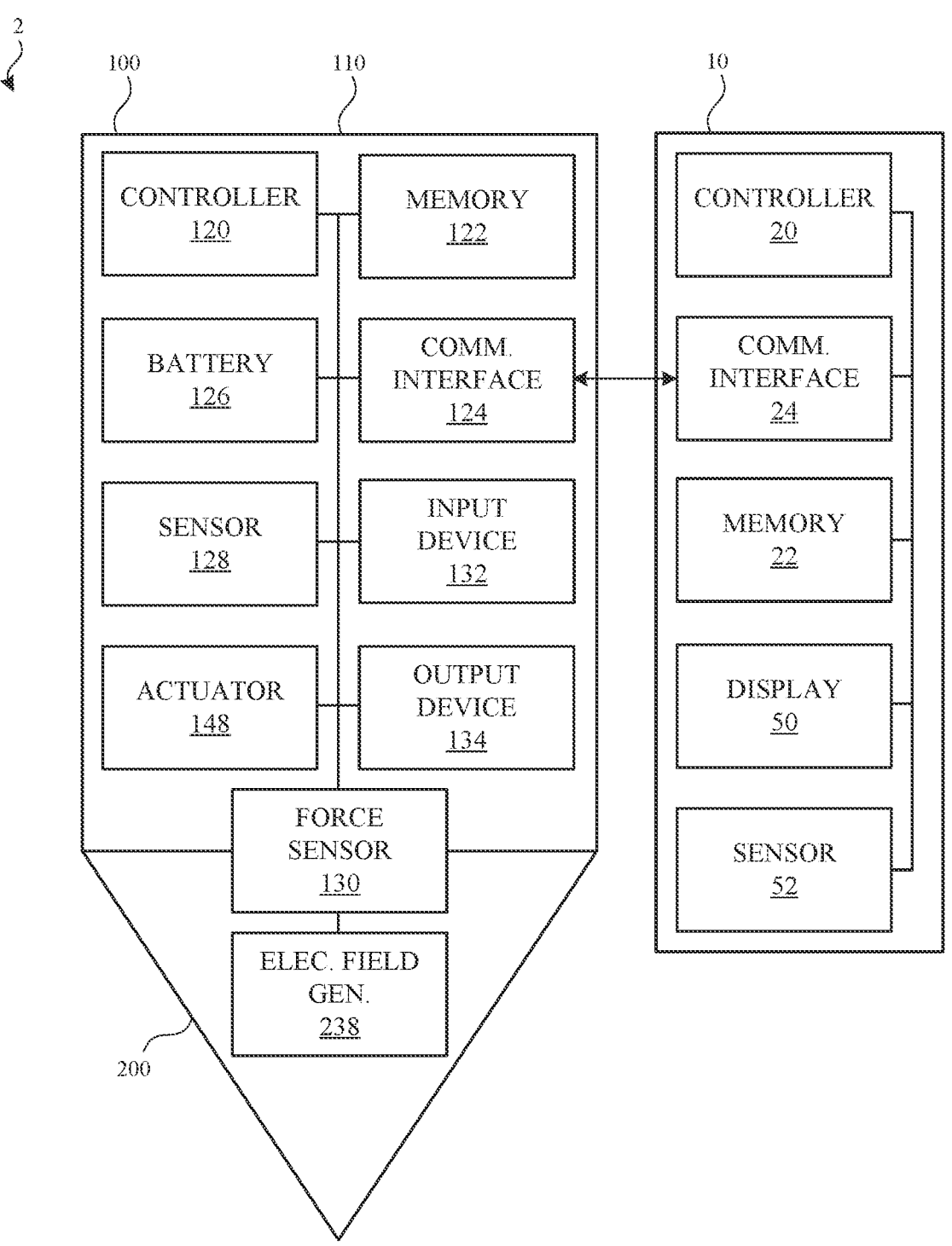
FIG. 3 illustrates a block diagram of the stylus and the external device of FIG. 2, according to some embodiments of the subject technology.

Referring now to FIG. 3, a stylus and an external device can include components that support operation by a user.

As shown in FIG. 3, stylus 100 can include a controller 120 (e.g., including a processor) and a memory 122 (e.g., non-transitory storage medium). Memory 122 can include, for example, a magnetic storage medium, optical storage medium, magneto-optical storage medium, read-only memory, random access memory, erasable programmable memory, flash memory, or combinations thereof. According to some embodiments, controller 120 can execute one or more instructions stored in memory 122 to perform one or more functions. For example, memory 122 can store one or more tip or other profiles that an actuator of stylus 100 may utilize to modify or otherwise control a characteristic of tip 200. In some cases, stylus 100 may retrieve a specific tip or other profile utilizing one or more inputs from a user and/or signals from external device 10.

Stylus 100 can include a battery 126, such as one or more batteries and/or power management units. Stylus 100 can include components for charging battery 126. The battery 126 can include one or more components for receiving and/or transmitting power wirelessly (e.g., inductively), for example from external device 10.

Stylus 100 can include a communication interface 124 for communicating with external device 10 and/or another device. Communication interface 124 can include one or more wired or wireless components, WiFi components, near field communication interfaces, Bluetooth components, and/ or other communication interfaces. Communication interface 124 can include one or more transmission elements, such as one or more antennas. Alternatively or in combination, communication interface 124 can include an interface for a wired connection to external device 10 and/or another device.

Stylus 100 can include one or more sensors 128 for detecting one or more conditions. In some embodiments, sensor 128 can detect motion characteristics of stylus 100 with a motion sensor such as an accelerometer, a gyroscope, a compass, a global positioning sensor, a tilt sensor, and so on for detecting movement and acceleration of stylus 100. In some embodiments, sensor 128 can detect environmental conditions and/or other aspects of the operating environment of stylus 100 with an environmental sensor such as an ambient light sensor, proximity sensor, temperature sensor, barometric pressure sensor, moisture sensor, and the like. In some embodiments, sensor 128 can detect biological characteristics of the user manipulating the stylus with a biosensor that detects skin temperature, heart rate, respiration rate, blood oxygenation level, blood volume estimates, blood pressure, or a combination thereof. In some embodiments, sensor 128 can quantify or estimate a property of an object (e.g., external device 10) nearby or otherwise external to stylus 100 with a utility sensor such as magnetic field sensors, electric field sensors, color meters, acoustic impedance sensors, pH level sensor, material detection sensor, and so on. Such data may be used to adjust or update the operation of stylus 100 and/or may communicate such data to external device 10 to adjust or update the operation thereof.

Stylus 100 can include one or more input devices 132 to receive input from a user. In some embodiments, input device 132 can detect contact by a user on a grip region of housing 110 of stylus 100. In some embodiments, input device 132 can include a capacitive touch sensor, such as a self-capacitance sensor. In some embodiments, input device 132 can include multiple sensing elements, such as conductive electrodes, to detect contact and changes in contact at multiple locations. In some embodiments, input device 132 can include other components including, but not limited to, sensors, capacitive touch sensors, switches (e.g., dome switches), buttons, keys, crowns, voice coils, microphones, and/or the like.

Stylus 100 can include one or more output devices 134 to provide output to a user. In some embodiments, output device 134 can include a display, speaker, haptic feedback component, light, and/or the like. In some embodiments, output device 134 can provide haptic feedback with tactile sensations to the user. The haptic feedback can be implemented as force feedback, vibratory feedback, tactile sensations, and the like. For example, output device 134 can include a linear actuator configured to provide punctuated haptic feedback, such as a tap or a knock.

Stylus 100 can include one or more force sensors 130 configured to interact with both tip 200 and housing 110 to detect relative motion of tip 200 and housing 110. For example, force sensor 130 can be operated to detect when tip 200 is contacting a surface, such as the surface of external device 10. The detection can be based on movement of tip 200 relative to housing 110. Accordingly, force sensor 130 can be directly or indirectly connected to both tip 200 and housing 110 to detect relative motion there between. Force sensor 130 can include a component that converts mechanical motion of tip 200 into an electric signal. Force sensor 130 can include one or more contact sensors, capacitive sensors, touch sensors, strain gauges, cameras, piezoelectric sensors, pressure sensors, photodiodes, and/or other sensors. Force sensor 130 can detect both the presence and magnitude of a force. In use, a user may manipulate stylus 100 and apply a force to a surface of external device 10. A corresponding reaction force may be transferred through tip 200 of stylus 100 connected to an electromechanical coupling and to force sensor 130 of stylus 100. Force sensor 130, or a portion thereof, may deform in response which may be measured and used to estimate the applied force. Force sensor 130 can be used to produce a non-binary output that corresponds to the applied force. For example, force sensor 130 can be used to produce an output that represents a magnitude that varies in accordance with a variable amount of applied force.

Stylus 100 can include one or more electric field generators 238 configured to emit an electric field for detection by external device 10. Electric field generators 238 can create substantially spherical electric fields at tip 200. Each of electric field generators 238 can include one or more conductive components. Electric field generators 238 can be spaced apart from each other so that the center of each corresponding electric field is at a different location. Accordingly, external device 10 can detect each corresponding electric field and determine a position and/or orientation of stylus 100.

While various components of stylus 100 are shown as being positioned at either housing and/or tip 200, it will be understood that any one or more components of stylus 100 can be positioned at any location thereof.

As further shown in FIG. 3, external device 10 can include a controller 20 (e.g., including a processor) and a memory 22 (e.g., non-transitory storage medium). Memory 22 can include, for example, a magnetic storage medium, optical storage medium, magneto-optical storage medium, read-only memory, random access memory, erasable programmable memory, flash memory, or combinations thereof. According to some embodiments, controller 20 can execute one or more instructions stored in memory 22 to perform one or more functions. For example, memory 22 can store one or more tip or other profiles that an actuator of stylus 100 may utilize to modify or otherwise control a characteristic of tip 200.

External device 10 can include a communication interface 24 for communicating with stylus 100 and/or another device. Communication interface 24 can include one or more wired or wireless components, WiFi components, near field communication interfaces, Bluetooth components, and/ or other communication interfaces. Communication interface 24 can include one or more transmission elements, such as one or more antennas. Alternatively or in combination, communication interface 24 can include an interface for a wired connection to stylus 100 and/or another device.

External device 10 can include display 50 for outputting visual information. Display 50 can include, for example, display devices, such as a liquid crystal display (LCD), a light emitting diode (LED) display, an organic light emitting diode (OLED) display, a flexible display, a flat panel display, a solid-state display, a projector, or any other device for outputting visual information. One or more implementations can include devices that function as both input and output devices, such as a touchscreen.

External device 10 can include one or more sensors 52. In some embodiments, sensors 52 can detect touch input, for example, with a capacitive touch sensor, a resistive touch sensor, and the like. In some embodiments, sensors 52 can detect electric fields output by electric field generators 238 of stylus 100. External device 10 can locate stylus 100 on a surface by monitoring each sensing node for changes and estimating the location at which such changes (if any) have occurred. Accordingly, external device 10 can detect each corresponding electric field and determine a position and/or orientation of stylus 100.

External device 10 can also include one or more other components that facilitate operation of external device 10. For example, external device 10 can include one or more of a power supply, one or more data connectors, one or more power connectors, one or more input/output devices, such as a speaker, a rotary input device, a microphone, an on/off button, a mute button, a biometric sensor, a camera, a force and/or touch sensitive trackpad, and so on.

Figures 4, 5:
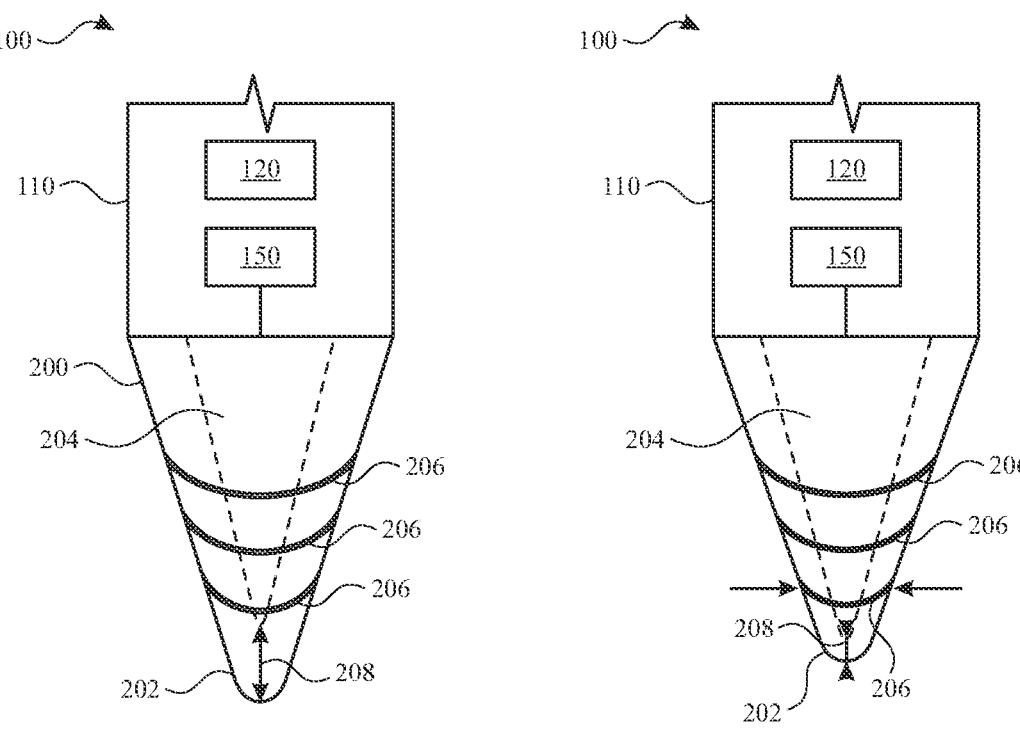
FIG. 4 illustrates a side view of a portion of a stylus, according to some embodiments of the subject technology.
FIG. 5 illustrates a side view of the portion of the stylus of FIG. 4, according to some embodiments of the subject technology.

Referring now to FIGS. 4 and 5, the tip of the stylus can include one or more features to controllably adjust the shape, size, and/or stiffness thereof. Such adjustments can alter the interactions between the stylus and an external device, thereby providing the user with a customizable experience based on a range of motion provided by features of the tip in response to an applied force.

As used herein, a range of motion of the tip can relate to any movement, deflection, compression, translation, rotation, or other motion in response to an applied force. In some embodiments, the range of motion can be determined based on the stiffness of the tip. For example, a tip having lower stiffness and higher modulus of elasticity can provide a range of motion at a region thereof that undergoes compression in response to an applied force. As used herein, stiffness and modulus of elasticity are inversely related, such that an increase in stiffness corresponds to a reduction in modulus of elasticity, and a reduction in stiffness corresponds to an increase in modulus of elasticity.

As shown in FIG. 4, tip 200 of stylus 100 can extend from an end of housing 110 of stylus 100. An outer periphery of tip 200 can be defined by a outer body 202. For example, outer body 202 can define an outermost shape and/or size of tip 200, including a terminal end of stylus 100 for contacting a surface during writing, drawing, and/or other touch inputs with stylus 100. In some embodiments, outer body 202 can have one or more characteristics that provides certain responses when operated by a user. For example, outer body 202 can have a certain modulus of elasticity or other characteristics that determine the stiffness of outer body 202 when force is applied thereto. For example, outer body 202 can have a tendency to compress when stylus 100 is pressed against a surface (e.g., surface of the external device). The stiffness of outer body 202 can be determined by various characteristics, such as material selection, shape, size, and the like. Tip 200 can further include a core 204 about which outer body 202 can extend. Core 204 can be substantially more rigid than outer body 202. For example, as outer body 202 is compressed (e.g., when a force is applied thereto), core 204 can provide a base toward which outer body 202 can move. It will be understood that such compression can alter characteristics of outer body 202.

As further shown in FIG. 4, tip 200 can further include one or more bands 206 extending about at least a portion of outer body 202. While bands 206 are shown in FIG. 4 is extending circumferentially about outer body 202, it will be understood that bands 206 can extend in any direction, such as longitudinally, diagonally, helically, and the like. Bands 206 can be separated from each other and/or overlapping each other. It will be further understood that any number of bands 206 can be provided.

As shown in FIG. 5, bands 206 can be actuated to alter a size, shape, and/or stiffness of outer body 202. For example, bands 206 can be mechanically controlled to apply a force and/or pressure to outer body 202. As bands 206 are controlled, outer body 202 can be correspondingly manipulated to take on a new size, shape, and/or stiffness. For example, in an actuated configuration, bands 206 can retract and/or compress outer body 202 toward core 204. By compressing outer body 202, apart from any external forces, outer body 202 is provided in a pre-compressed state, such that further compressions (e.g., from an external force against a writing surface), will yield less compression than when the bands 206 are not actuated. As such, the overall stiffness of outer body 202 can be altered (e.g., decreased) by actuating bands 206.

As further shown in FIGS. 4 and 5, the range of motion 208 provided by the outer body 202 can vary based on the configuration of the bands 206. For example, by retracting outer body 202 from the uncompressed configuration of FIG. 4 to the compressed configuration of FIG. 5, the range of motion 208 can be reduced, in that the lesser amount of available compression of outer body 202 remaining in response to an applied force is reduced.

Accordingly, outer body 202 can have an adjustable size, shape, and/or stiffness. The size, shape, and/or stiffness of outer body 202 can be selected manually by a user or automatically based on programmed parameters. The size, shape, and/or stiffness of outer body 202 can be altered to mimic characteristics of a particular writing or drawing tool (e.g., pen, pencil, chalk, marker, or paintbrush, etc.) and/or drawing surface (e.g., paper, canvas, whiteboard, etc.). Such adjustments can be made in response to a user input, a signal from external device, and/or one or more detected conditions.

According to some embodiments, the shape of bands 206 can be adjusted by applying, with an actuator 150 operated by controller 120, a thermal stimulus to bands 206. Bands 206 can include a shape-memory material that is responsive to temperature conditions. Examples of such materials include nitinol (nickel and titanium alloy); copper, zinc, and aluminum (Cu—Zn—Al) alloys; copper, aluminum, and nickel (Cu—Al—Ni) alloys; iron, manganese, and silicon (Fe—Mn—Si) alloys, and the like. Bands 206 can have a first shape in a martensite phase of the shape-memory material and a second shape in an austenite phase of the shape-memory material. Actuator 150 of stylus 100 can be or include a heater to apply heat to bands 206 and/or a cooler to remove heat from bands 206. Such heating and/or cooling can be induced, for example, by applied electrical current, thermal conduction, thermal convection, and the like.

According to some embodiments, the shape of bands 206 can be adjusted by applying, with actuator 150, an electrical stimulus to bands 206. For example, bands 206 can include a charge induced material (e.g., electroactive polymer) that is responsive to electric fields. Bands 206 can have a first shape in the presence of an electric field and a second shape in the absence of the electric field or in the presence of a different electric field. Actuator 150 element can be or include a voltage source connected to bands 206.

According to some embodiments, bands 206 can be adjusted by applying, with actuator 150, a stimulus including a force and/or torque thereto. The actuator 150 can be or include a motor or other mechanism for moving bands 206. Operation of actuator 150 can push or pull bands 206 to adjust their size, shape, and/or arrangement with respect to outer body 202. Upon achieving a target configuration of bands 206 and/or outer body 202, actuator 150 can persistently maintain the configuration for a duration of time, for example, by actively controlling the actuator 150 and/or by applying a locking mechanism, such as a detent or latch, to secure the bands 206.

Figure 6:
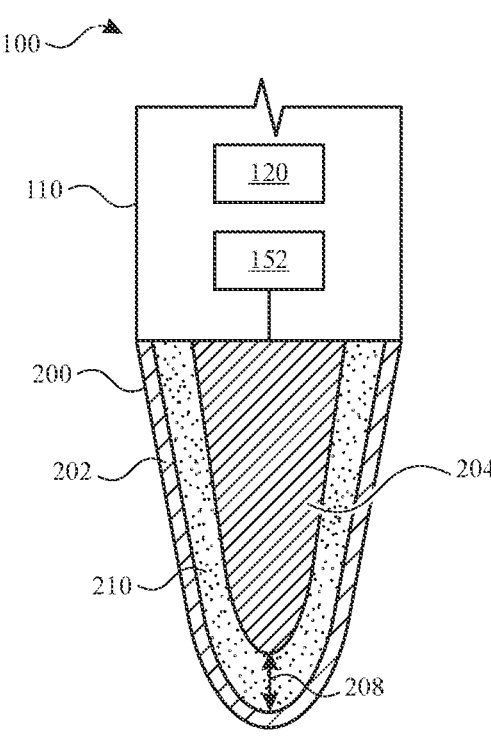
FIG. 6 illustrates a side view of a portion of a stylus, according to some embodiments of the subject technology.

Referring now to FIG. 6, the tip of the stylus can include one or more features to controllably adjust the shape, size, and/or stiffness thereof. Such adjustments can alter the interactions between the stylus and an external device, thereby providing the user with a customizable experience based on a range of motion provided by features of the tip in response to an applied force.

As shown in FIG. 6, tip 200 of stylus 100 can extend from an end of housing 110 of stylus 100. An outer periphery of tip 200 can be defined by outer body 202. For example, outer body 202 can define an outermost shape and/or size of tip 200, including a terminal end of stylus 100 for contacting a surface during writing, drawing, and/or other touch inputs with stylus 100. Tip 200 can further include a core 204 about which outer body 202 can extend. A fluid 210 can be provided between (e.g., radially between) core 204 and outer body 202. Core 204 can be substantially more rigid than outer body 202. For example, as outer body 202 is compressed (e.g., when a force is applied thereto), core 204 can provide a base toward which outer body 202 can move. It will be understood that such compression can alter characteristics of outer body 202 and/or fluid 210.

Outer body 202 can have an ability to compress when stylus 100 is pressed against a surface (e.g., surface of the external device). The stiffness of tip 200 can be determined by various characteristics, such as a feature and/or condition of fluid 210. In some embodiments, outer body 202 and/or a fluid 210 can have one or more characteristics that provides certain responses when operated by a user. For example, fluid 210 can be a magnetorheological fluid and/or ferrofluid that is responsive to magnetic fields. According to some embodiments, a condition of fluid 210 can be adjusted by applying, with an actuator 152 operated by controller 120, a magnetic field. Actuator 152 can be or include a permanent magnet and/or an electromagnet to apply the magnetic field. As actuator 152 applies different magnitudes of magnetic field, the apparent viscosity of fluid 210 can be altered accordingly. For example, fluid 210 can approach the characteristics of a viscoelastic solid in the presence of an applied magnetic field. As such, the stiffness of tip 200 (as experienced at outer body 202) can correspondingly be altered.

As further shown in FIG. 6, the range of motion 208 provided by outer body 202 can vary based on the configuration of the fluid 210. For example, by applying a magnetic field to fluid 210, the range of motion 208 of outer body 202 toward or away from core 204 can be reduced, in that fluid 210 can have a reduced tendency to be urged away from the region of compression when it has greater viscosity. In some embodiments, the range of motion 208 can be determined based on the viscosity of fluid 210. For example, fluid 210 in a less viscous configuration (e.g., in the absence of a magnetic field or in the presence of a relatively weak magnetic field) can provide a larger range of motion 208 to outer body 202 at a region thereof that undergoes compression in response to an applied force. By further example, fluid 210 in a more viscous configuration (e.g., in the presence of a relatively strong magnetic field) can provide a smaller range of motion 208 to outer body 202 at a region thereof that undergoes compression in response to an applied force.

Accordingly, tip 200 can have an adjustable size, shape, and/or stiffness. The size, shape, and/or stiffness of tip 200 can be selected manually by a user or automatically based on programmed parameters. The size, shape, and/or stiffness of tip 200 can be altered to mimic characteristics of a particular writing or drawing tool (e.g., pen, pencil, chalk, marker, or paintbrush, etc.) and/or drawing surface (e.g., paper, canvas, whiteboard, etc.). Such adjustments can be made in response to a user input, a signal from external device, and/or one or more detected conditions.

Figures 7, 8:
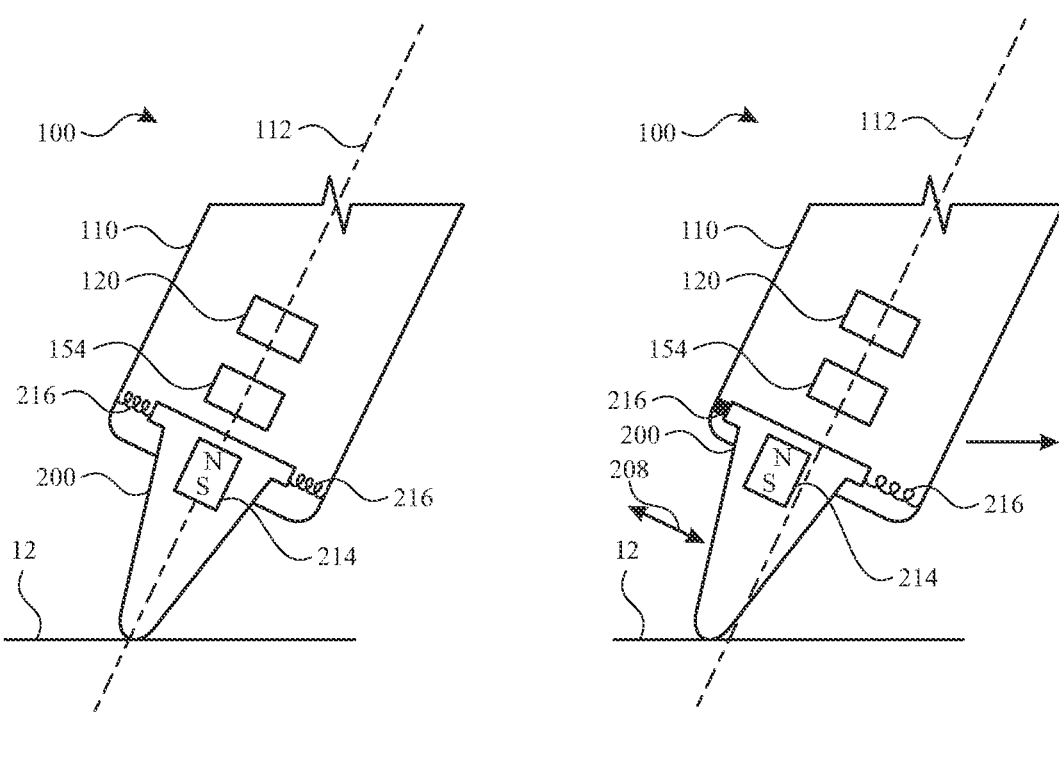
FIG. 7 illustrates a side view of a portion of a stylus and an external device, according to some embodiments of the subject technology.
FIG. 8 illustrates a side view of the portion of the stylus and the external device of FIG. 7, according to some embodiments of the subject technology.
Figure 9:
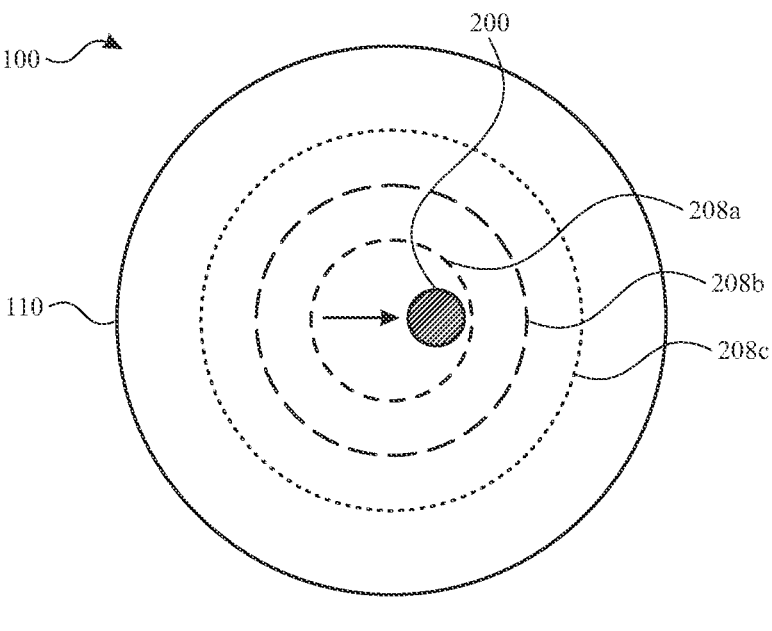
FIG. 9 illustrates a front view of a portion of the stylus of FIGS. 7 and 8, according to some embodiments of the subject technology.

Referring now to FIGS. 7-9, a tip of a stylus can deflect (e.g., with translation) from an axis of the stylus to simulate the responsiveness of a particular writing or drawing tool. The range of motion of the tip in response to an applied force can be determined based on the range of translation available with respect to an axis of the stylus.

As shown in FIG. 7, tip 200 of stylus 100 can extend from an end of housing 110 of stylus 100. Tip 200 can be coupled to housing 110 in a manner that allows deflection of tip 200 with respect to an axis 112 of stylus 100. Axis 112 of stylus 100 can be a central axis and/or a longitudinal axis that extends along a length defining a maximum dimension of stylus 100. Tip 200 can be coupled to housing 110 by one or more springs 216 that bias tip 200 toward axis 112. While springs 216 are illustrated in FIGS. 7 and 8 as mechanical (e.g., coil) springs, it will be understood that a variety of springlike mechanisms can be included, such as magnets, compressible fluids, and the like. For example, in the absence of an applied force, tip 200 can be biased to be aligned with the axis 112.

As shown in FIGS. 7 and 8, tip 200 can be provided with a range of motion 208 that is transverse (e.g., lateral or orthogonal) to axis 112. It will be understood that tip 200 can also be provided with one or more other directions for its range of motion 208. In some embodiments, deflection of tip 200 can occur in response to an applied force. For example, as stylus 100 is moved with tip 200 contacting a surface 12, a force can be applied to tip 200 as a result of such movement. In particular, housing 110 can be gripped by a user and pulled in one direction while tip 200 is dragged in another direction due to friction with a surface 12. Such deflection can simulate deflection of a drawing or writing tool having a flexible tip, such as a paintbrush.

As further shown in FIGS. 7 and 8, tip 200 can further include a magnet 214, and housing 110 can further include an actuator 154 for interacting with magnet 214. For example, actuator 154 can include a permanent magnet and/or an electromagnet that generates a magnetic field. Actuator 154 can be operated to control the strength of magnetic coupling with magnet 214 of tip 200. Accordingly, the biasing force drawing the tip 200 to be aligned with axis 112 can be variably controlled.

In some embodiments, range of motion 208 can be determined based on the applied magnetic field. As shown in FIG. 9, range of motion 208 provided by tip 200 with respect to housing 110 can vary based on the operation of actuator 154. For example, by applying a relatively strong magnetic field, tip 200 can have a relatively small range of motion 208a. By further example, by applying a relatively weak magnetic field, tip 200 can have a relatively larger range of motion 208b or 208c. By further example, by applying no magnetic field, tip 200 can have a relatively larger range of motion 208c.

Accordingly, tip 200 can have an adjustable range of translational motion for responsiveness to an applied force. The range of motion of tip 200 can be selected manually by a user or automatically based on programmed parameters. The range of motion of tip 200 can be altered to mimic characteristics of a particular writing or drawing tool (e.g., pen, pencil, chalk, marker, or paintbrush, etc.) and/or drawing surface (e.g., paper, canvas, whiteboard, etc.). Such adjustments can be made in response to a user input, a signal from external device, and/or one or more detected conditions.

Figure 10:
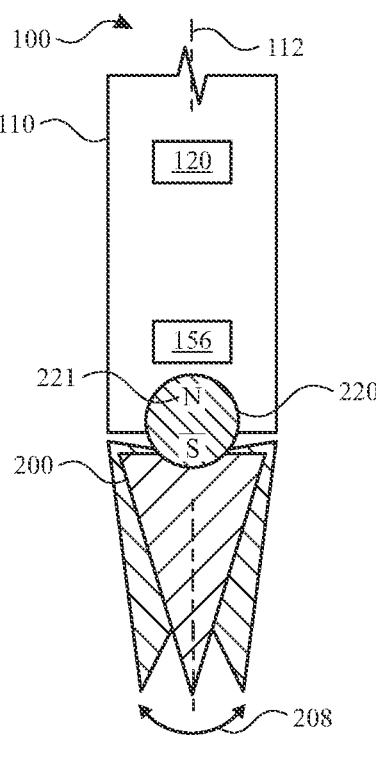
FIG. 10 illustrates a side view of a portion of a stylus, according to some embodiments of the subject technology.
Figure 11:
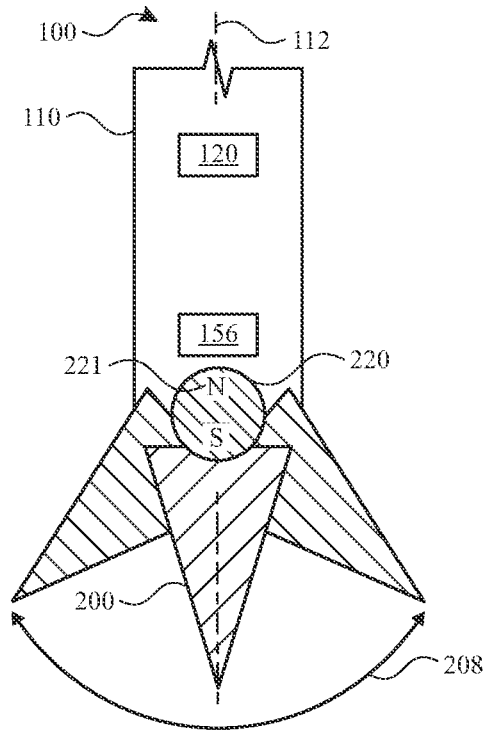
FIG. 11 illustrates a side view of the portion of the stylus of FIG. 10 9, according to some embodiments of the subject technology.

Referring now to FIGS. 10 and 11, a tip of a stylus can deflect (e.g., with rotation) from an axis of the stylus to simulate the responsiveness of a particular writing or drawing tool. The range of motion of the tip in response to an applied torque (i.e., force applied at a distance away from a pivot of fulcrum) can be determined based on the range of rotation available with respect to an axis of the stylus.

As shown in FIG. 10, tip 200 of stylus 100 can extend from an end of housing 110 of stylus 100. Tip 200 can be coupled to housing 110 in a manner that allows rotation of tip 200 with respect to axis 112 of stylus 100. For example, tip 200 can be coupled to housing 110 by a pivot 220. Pivot 220 and/or another component can include a magnet that biases tip 200 toward alignment with axis 112. For example, in the absence of an applied torque, tip 200 can be biased to be rotationally aligned with the axis 112.

As shown in FIGS. 10 and 11, tip 200 can be provided with a range of motion 208 that is rotational (e.g., adjusting an angle) with respect to axis 112. It will be understood that tip 200 can be rotated in any number of planes with respect to axis 112. For example, pivot 220 can form a ball joint between tip 200 and housing 110. In some embodiments, deflection of tip 200 can occur in response to an applied torque. For example, as stylus 100 is moved with tip 200 contacting a surface, a torque can be applied to tip 200 as a result of such movement. In particular, housing 110 can be gripped by a user and pulled in one direction while tip 200 is dragged in another direction due to friction with the surface. Such deflection can simulate deflection of a drawing or writing tool having a bendable tip, such as a paintbrush.

As further shown in FIGS. 10 and 11, pivot 220 and/or another component coupled to tip 200 can include a magnet 221, and housing 110 can further include an actuator 156 for interacting with magnet 221. For example, actuator 156 can include a permanent magnet and/or an electromagnet that generates a magnetic field. Actuator 156 can be operated to control the strength of magnetic coupling with magnet 221 of tip 200. Accordingly, the biasing torque drawing the tip 200 to be aligned with axis 112 can be variably controlled such that the magnet 221 tends to be aligned with the applied magnetic field.

In some embodiments, range of motion 208 can be determined based on the applied magnetic field. As shown in FIGS. 10 and 11, range of motion 208 provided by tip 200 with respect to housing 110 can vary based on the operation of actuator 156. For example, as shown in FIG. 10, by applying a relatively strong magnetic field, tip 200 can have a relatively small range of motion 208. By further example, as shown in FIG. 11, by applying a relatively weak magnetic field or no magnetic field, tip 200 can have a relatively larger range of motion 208.

Accordingly, tip 200 can have an adjustable range of rotational motion for responsiveness to an applied torque. The range of motion of tip 200 can be selected manually by a user or automatically based on programmed parameters. The range of motion of tip 200 can be altered to mimic characteristics of a particular writing or drawing tool (e.g., pen, pencil, chalk, marker, or paintbrush, etc.) and/or drawing surface (e.g., paper, canvas, whiteboard, etc.). Such adjustments can be made in response to a user input, a signal from external device, and/or one or more detected conditions.

Referring now to FIGS. 12-17, a tip of a stylus can deflect (e.g., with rotation) from an axis of the stylus to simulate the responsiveness of a particular writing or drawing tool. The range of motion of the tip in response to an applied torque can be determined based on the range of rotation available with respect to an axis of the stylus.

Figure 12:
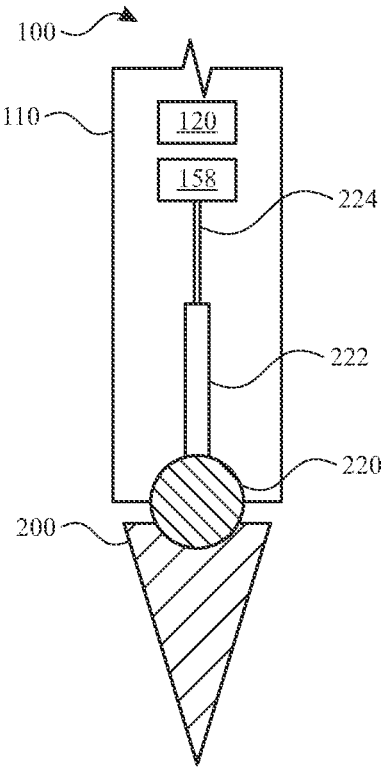
FIG. 12 illustrates a side view of a portion of a stylus, according to some embodiments of the subject technology.

As shown in FIG. 12, tip 200 of stylus 100 can extend from an end of housing 110 of stylus 100. Tip 200 can be coupled to housing 110 in a manner that allows rotation of tip 200 with respect to axis 112 of stylus 100. For example, tip 200 can be coupled to housing 110 by a pivot 220. Pivot 220 and/or another component can receive or otherwise be coupled to a beam 224 that biases tip 200 toward alignment with axis 112. For example, beam 224 can extend through a tube 222 that extends toward and/or to pivot 220. Beam 224 can extend to, through, and/or around pivot 220. For example, beam 224 can extend through a channel 226 of pivot 220. With such coupling, rotation of pivot 220 can cause deflection of beam 224. Beam 224 can apply a biasing force and/or torque in which it tends towards a particular configuration. For example, in the absence of an applied torque, tip 200 can be biased to be rotationally aligned with the axis 112.

Figure 13:
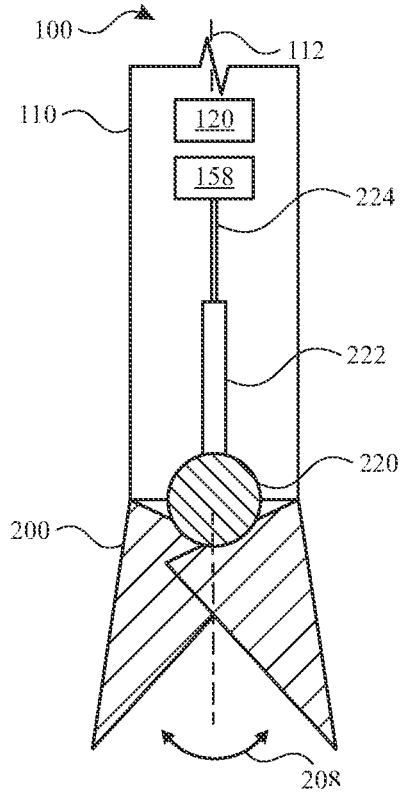
FIG. 13 illustrates a side view of the portion of the stylus of FIG. 12, according to some embodiments of the subject technology.

As shown in FIG. 13, tip 200 can be provided with a range of motion 208 that is rotational (e.g., adjusting an angle) with respect to axis 112. It will be understood that tip 200 can be rotated in any number of planes with respect to axis 112. For example, pivot 220 can form a ball joint between tip 200 and housing 110. In some embodiments, deflection of tip 200 can occur in response to an applied torque. For example, as stylus 100 is moved with tip 200 contacting a surface, a torque can be applied to tip 200 as a result of such movement. In particular, housing 110 can be gripped by a user and pulled in one direction while tip 200 is dragged in another direction due to friction with the surface. Such deflection can simulate deflection of a drawing or writing tool having a bendable tip, such as a paintbrush.

According to some embodiments, the shape of beam 224 can be adjusted by applying, with an actuator 158 operated by controller 120, a thermal stimulus to beam 224. Beam 224 can include a shape-memory material that is responsive to temperature conditions. Examples of such materials include nitinol (nickel and titanium alloy); copper, zinc, and aluminum (Cu—Zn—Al) alloys; copper, aluminum, and nickel (Cu—Al—Ni) alloys; iron, manganese, and silicon (Fe—Mn—Si) alloys, and the like. Beam 224 can have a first shape in a martensite phase of the shape-memory material and a second shape in an austenite phase of the shape-memory material. Actuator 158 of stylus 100 can be or include a heater to apply heat to beam 224 and/or a cooler to remove heat from beam 224. Such heating and/or cooling can be induced, for example, by applied electrical current, thermal conduction, thermal convection, and the like.

According to some embodiments, the shape of beam 224 can be adjusted by applying, with actuator 158, an electrical stimulus to beam 224. For example, beam 224 can include a charge induced material (e.g., electroactive polymer) that is responsive to electric fields. Beam 224 can have a first shape in the presence of an electric field and a second shape in the absence of the electric field or in the presence of a different electric field. Actuator 158 element can be or include a voltage source connected to beam 224.

According to some embodiments, beam 224 can be adjusted by applying, with actuator 158, a stimulus including a force and/or torque thereto. The actuator 158 can be or include a motor or other mechanism for moving beam 224. Operation of actuator 158 can push or pull beam 224 to adjust its size, shape, and/or arrangement with respect to tip 200 and/or pivot 220. Upon achieving a target configuration of beam 224, actuator 158 can persistently maintain the configuration for a duration of time, for example, by actively controlling the actuator 158 and/or by applying a locking mechanism, such as a detent or latch, to secure the beam 224.

Figures 14, 15, 16, 17:
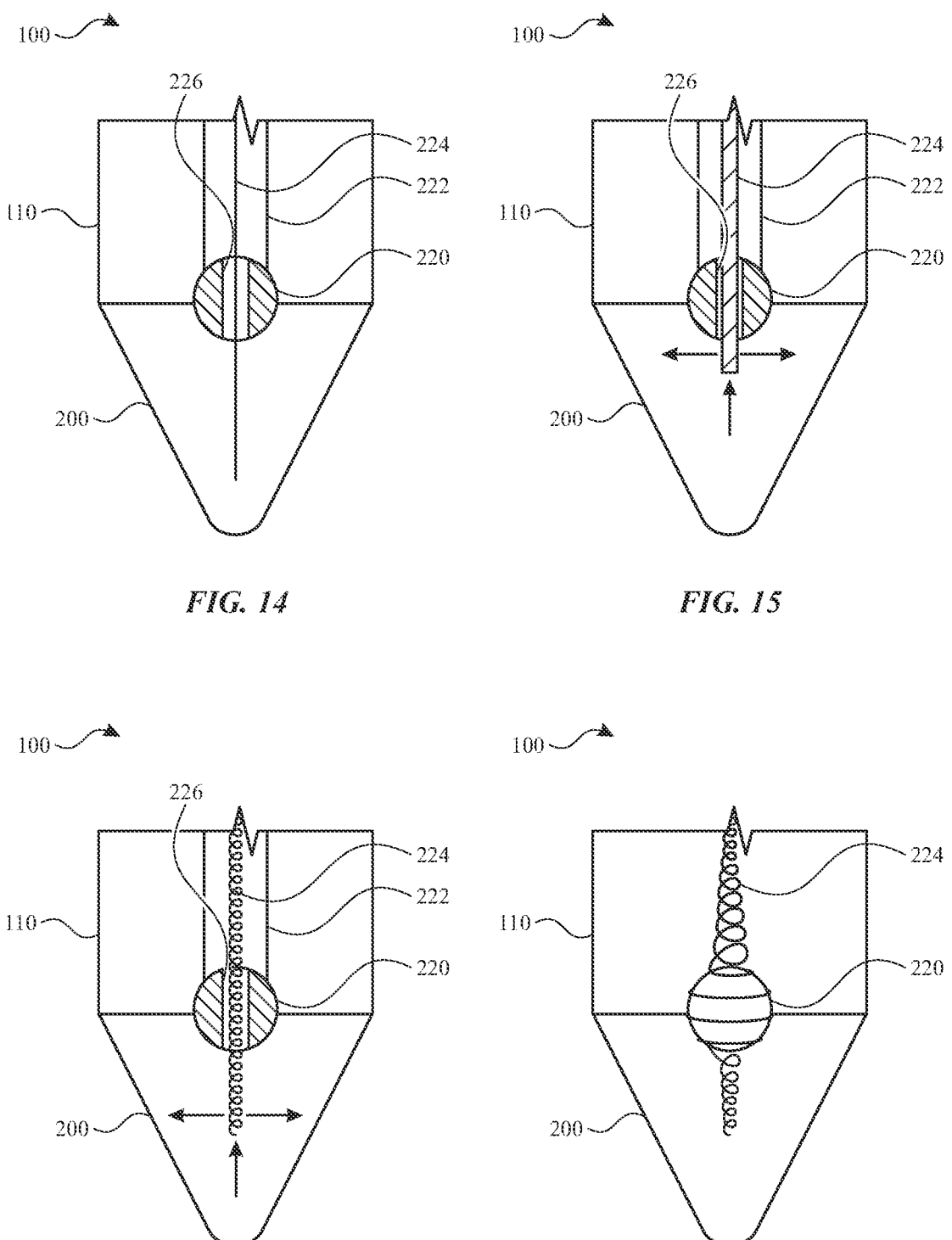
FIG. 14 illustrates a side view of a portion of the stylus of FIGS. 12-13, according to some embodiments of the subject technology.
FIG. 15 illustrates a side view of the portion of the stylus of FIGS. 12-14, according to some embodiments of the subject technology.
FIG. 16 illustrates a side view of a portion of the stylus of FIGS. 12-13, according to some embodiments of the subject technology.
FIG. 17 illustrates a side view of a portion of the stylus of FIGS. 12-13, according to some embodiments of the subject technology.

As shown in FIGS. 14 and 15, beam 224 can be actuated to alter a size and/or shape thereof. For example, beam 224 can be mechanically controlled to interact in different ways with pivot 220. In some embodiments, beam 224 can alter its size (e.g., in at least one dimension thereof) in response to an applied stimulus that provides actuation of beam 224. For example, as shown in FIG. 14, in a relaxed configuration, beam 224 interacts lightly with pivot 220 while it is more flexible and/or bendable (e.g., less thick or rigid). By further example, as shown in FIG. 15, in an actuated configuration, beam 224 interacts more significantly with pivot 220 while it is less flexible and/or bendable (e.g., more thick or rigid). By actuating beam 224, a greater torque is required at tip 200 to achieve a given amount of rotation. Accordingly, the range of motion is limited while beam 224 is actuated.

While one type of actuation is illustrated in FIGS. 14 and 15, it will be understood that a variety of types of actuations can be provided. In some embodiments, beam 224 can alter its shape in response to an applied stimulus that provides actuation of beam 224. As shown in FIG. 16, beam 224 can be configured to take a different shape when actuated (e.g., from the configuration of FIG. 14). For example, beam 224 can become more coiled, curved, rectilinear, and the like when actuated. By further example, beam 224 can alter its overall size (e.g., in at least one dimension thereof) when actuated as it takes on the new shape. The actuated shape of beam 224 can interact differently with pivot 220 to provide the adjusted range of motion.

While one arrangement is illustrated in FIGS. 14-16, it will be understood that a variety of arrangements can be provided. In some embodiments, as shown in FIG. 17, beam 224 can extend about pivot 220. For example, beam 224 can be coupled to an outer surface of pivot 220 and/or to another portion of tip 200, such that rotation of tip 200 about pivot 220 causes deflection of beam 224 about a fulcrum. Beam 224 can provide the biasing force to urge tip 200 to be aligned with the axis of stylus 100.

Accordingly, tip 200 can have an adjustable range of rotational motion for responsiveness to an applied torque. The range of motion of tip 200 can be selected manually by a user or automatically based on programmed parameters. The range of motion of tip 200 can be altered to mimic characteristics of a particular writing or drawing tool (e.g., pen, pencil, chalk, marker, or paintbrush, etc.) and/or draw-ing surface (e.g., paper, canvas, whiteboard, etc.). Such adjustments can be made in response to a user input, a signal from external device, and/or one or more detected conditions.

Referring now to FIGS. 18-21, the tip of the stylus can include one or more features to controllably adjust the shape, size, and/or stiffness thereof. Such adjustments can alter the interactions between the stylus and an external device, thereby providing the user with a customizable experience based on a range of motion provided by features of the tip in response to an applied force.

In some embodiments, the range of motion at a tip can be determined based on the deployment configuration of portions of the tip. For example, a tip having deployable, expandable, and/or inflatable portions can alter its exterior features based on the status of deployment, expansion, and/or inflation. Such a region can thereby have variable range of motion at a region thereof that undergoes compression in response to an applied force.

Figures 18, 19, 20, 21:
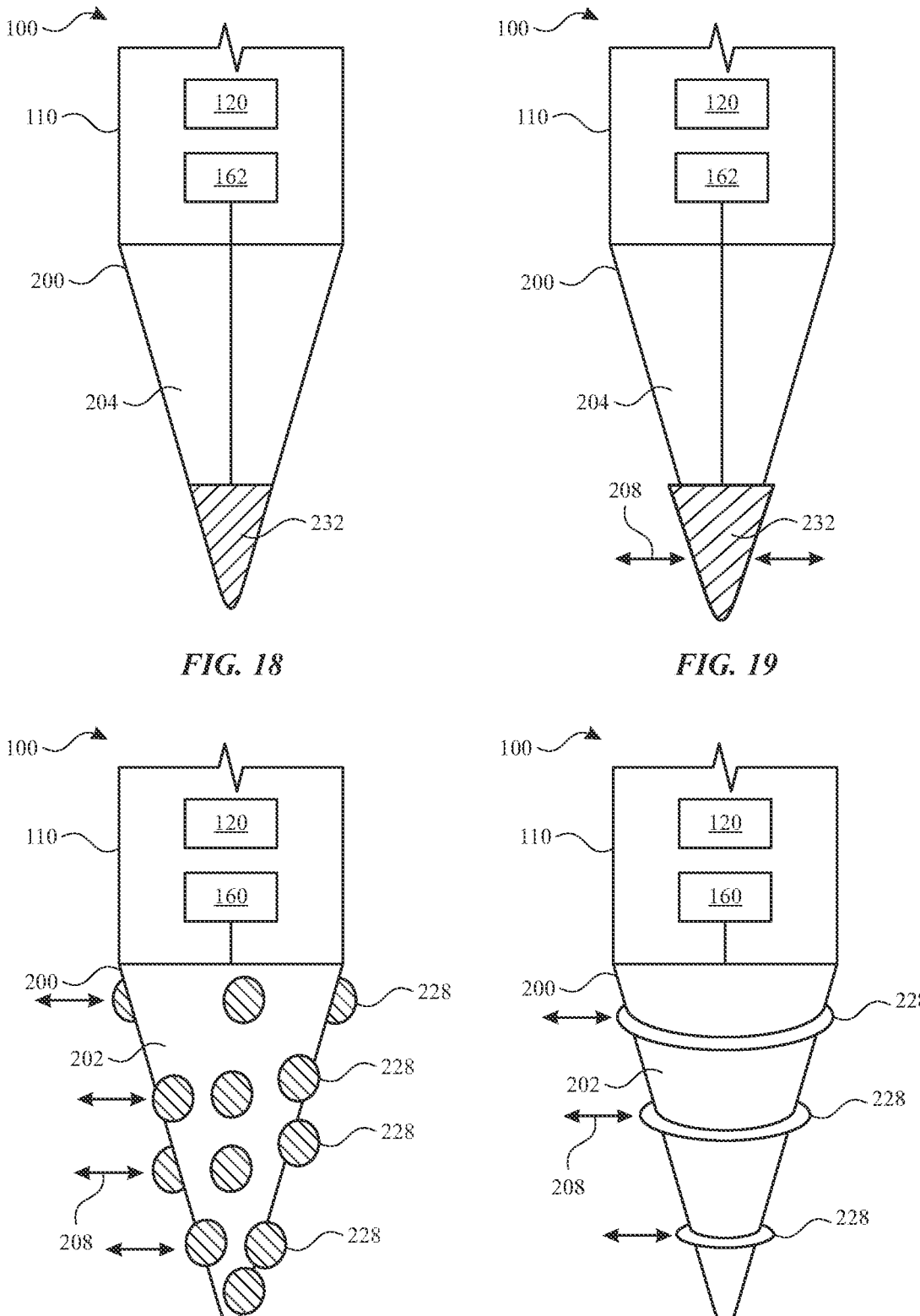
FIG. 18 illustrates a side view of a portion of a stylus, according to some embodiments of the subject technology.
FIG. 19 illustrates a side view of a portion of a stylus, according to some embodiments of the subject technology.
FIG. 20 illustrates a side view of a portion of a stylus, according to some embodiments of the subject technology.
FIG. 21 illustrates a side view of a portion of a stylus, according to some embodiments of the subject technology.

As shown in FIG. 18, tip 200 of stylus 100 can extend from an end of housing 110 of stylus 100. A portion of an outer periphery of tip 200 can be defined by core 204. For example, core 204 can be substantially rigid. Tip 200 can also include a pillow 232 that can be inflated to alter a size, shape, and/or stiffness thereof. Pillow 232 can include and/or define a terminal end of stylus 100 for contacting a surface during writing, drawing, and/or other touch inputs with stylus 100. In some embodiments, pillow 232 can have one or more characteristics that provides certain responses when operated by a user. For example, pillow 232 can have a certain modulus of elasticity or other characteristics that determine the stiffness of pillow 232 when force is applied thereto. For example, pillow 232 can have a tendency to compress when stylus 100 is pressed against a surface (e.g., surface of the external device). The stiffness of pillow 232 can be determined by various characteristics, such as an inflation status thereof.

As shown in FIG. 19, pillow 232 can be actuated to alter a size, shape, and/or stiffness of tip 200. For example, pillow 232 can be inflated and/or deflated with a fluid. As pillow 232 is actuated, pillow 232 can be correspondingly take on a new size, shape, and/or stiffness. For example, in an actuated configuration, pillow 232 can expand outwardly away from core 204. By expanding pillow 232 away from core 204 with a fluid (e.g., compressible and/or displaceable fluid), apart from any external forces, pillow 232 is provided in a state that allows compressions (e.g., from an external force against a writing surface), which will yield more compression with respect to core 204 than when pillow 232 is not actuated. As such, the overall stiffness of tip 200 can be altered (e.g., increased) by inflating pillow 232.

Pillow 232 can be actuated by actuator 162 based on operation by controller 120. Actuator 162 can include a pump or other mechanism for moving fluid into or out of pillow 232. It will be understood that other mechanisms can be provided to alter the configuration of pillow 232.

As further shown in FIG. 19, the range of motion 208 provided by pillow 232 can vary based on the configuration of pillow 232. For example, by expanding pillow 232 from the compressed configuration of FIG. 18 to the expanded configuration of FIG. 19, the range of motion 208 can be increased, in that the amount of available compression of pillow 232 with respect to core 204 is increased.

In some embodiments, further inflation of pillow 232 can decrease the range of motion 208. For example, where pillow 232 reaches a limit of volumetric expansion, further inflation increases pressure within pillow 232 without increasing the distance away from core 204. Accordingly, the higher pressure within pillow 232 can result in smaller range of motion 208 by allowing less compression in response to an applied force.

As shown in each of FIGS. 20 and 21, tip 200 of stylus 100 can extend from an end of housing 110 of stylus 100. A portion of an outer periphery of tip 200 can be defined by outer body 202. Tip 200 can also include pillows 228 that can be inflated to alter a size, shape, and/or stiffness thereof. In some embodiments, pillows 228 can have one or more characteristics that provides certain responses when operated by a user. For example, pillows 228 can have a certain modulus of elasticity or other characteristics that determine the stiffness of pillows 228 when force is applied thereto. In some embodiments, pillows 228 can have a modulus of elasticity that is lower than a modulus of elasticity of outer body 202. For example, pillows 228 can have a greater tendency to compress when stylus 100 is pressed against a surface (e.g., surface of the external device) than does outer body 202.

Pillows 228 can be distributed at various locations along tip 200, such as at portions for contacting a surface during writing, drawing, and/or other touch inputs with stylus 100. As shown in FIG. 20, pillows 228 can be discrete and distributed along the length and circumference of outer body 202, including a terminal end and/or sides thereof. As shown in FIG. 21, pillows 228 can be continuous and extending along the length and/or circumference of outer body 202, including a terminal end and/or sides thereof.

As shown in each of FIGS. 20 and 21, pillows 228 can be actuated to protrude beyond outer body 202. For example, pillow 228 can be moved, pushed, inflated, and/or otherwise actuated to extend beyond an outer periphery of outer body 202. When actuated, pillows 228 define the outermost periphery of tip 200, thereby providing contact and engagement surfaces during user of the stylus against a surface. In contrast, when not actuated, outer body 202 can define the outermost periphery of tip 200. Accordingly, the characteristics of an interaction between tip 200 and a surface can be defined by the structure that defines the outermost periphery.

Pillow 228 can be actuated by actuator 160 based on operation by controller 120. Actuator 160 can include a motor, pump, heater, electromagnet, or other mechanism for controlling deployment of pillows 228. It will be understood that other mechanisms can be provided to alter the configuration of pillows 228.

The range of motion 208 provided by tip 200 can vary based on whether pillows 228 or outer body 202 define the outermost periphery of tip 200. For example, by deploying pillows 228, the lower modulus provided thereby define the interactions with a surface, including responsiveness (e.g., by compression thereof) to an applied force. By retracting pillows 228, the greater modulus provided by outer body 202 define the interactions with a surface, including responsiveness (e.g., by compression thereof) to an applied force.

Accordingly, tip 200 can have an adjustable size, shape, and/or stiffness. The size, shape, and/or stiffness of tip 200 can be selected manually by a user or automatically based on programmed parameters. The size, shape, and/or stiffness of tip 200 can be altered to mimic characteristics of a particular writing or drawing tool (e.g., pen, pencil, chalk, marker, or paintbrush, etc.) and/or drawing surface (e.g., paper, canvas, whiteboard, etc.). Such adjustments can be made in response to a user input, a signal from external device, and/or one or more detected conditions.

Referring now to FIGS. 22-26, a stylus can include a tip with multiple bristles to simulate an experience of using a tool (e.g., paintbrush) with multiple bristles.

Figure 22:
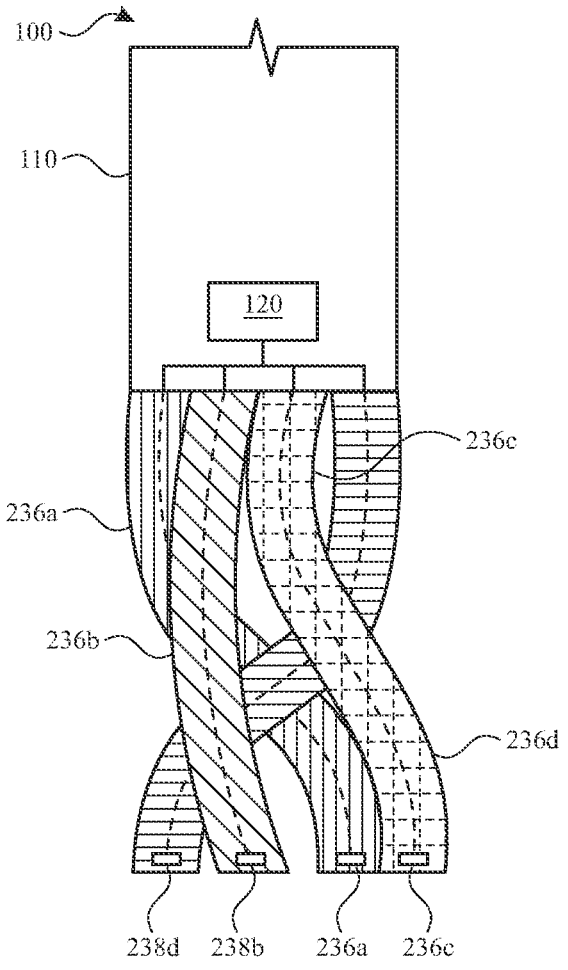
FIG. 22 illustrates a side view of a portion of a stylus and an external device, according to some embodiments of the subject technology.

As shown in FIG. 22, tip 200 of stylus 100 can extend from an end of housing 110 of stylus 100. Multiple bristles 236a, 236b, 236c, and 236d can be provided. Each of bristles 236a-d can be coupled to the same end of housing 110. Each of bristles 236a-d can be flexible to bend with respect to housing 110. As such, ends of bristles 236a-d can each move independently of each other.

Each of bristles 236a-d can be independently detected by an external device. For example, each of bristles 236a-d can include an electric field generator. For example, first bristle 236a can include a first electric field generator 238a, second bristle 236b can include a second electric field generator 238b, third bristle 236c can include a third electric field generator 238c, and fourth bristle 236d can include a fourth electric field generator 238d. Each of electric field generators 238a-d can be positioned at or near an end of a corresponding one of bristles 236a-d that is opposite housing 110. Each of electric field generators 238a-d can be operably connected to controller 120 control of the electric field generated.

Controller 120 can operate each of electric field generators 238a-d to facilitate independent detection by the external device. For example, controller 120 is configured to transmit signals to each of electric field generators 238a-d to generate electric fields based on the signals. Each of the signals can be modulated with an operating parameter that is different than an operating parameter of every other one of the signals. As such, each electric field generator can be detected independently of the others. In some embodiments, the operating parameter for modulation is a frequency of the signal. For example, frequency multiplexing can be used to distinguish the electric fields from each other based on corresponding signals provided to each. In some embodiments, the operating parameter for modulation is a time of the signal. For example, time multiplexing can be used to distinguish the electric fields from each other based on corresponding signals provided to each. Regardless of the technique, stylus 100 and the external device can coordinate so that the external device can detect and discern the electric fields from each other and correlate each to the correspondingly appropriate electric field generators 238a-d and bristles 236a-d. Accordingly, the external device can detect each of the bristles 236a-d as inputs during operation of the stylus 100.

Figure 23:
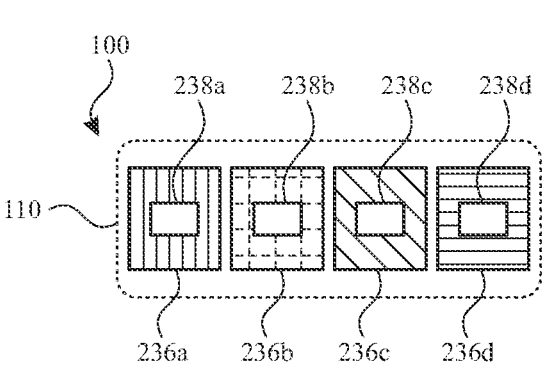
FIG. 23 illustrates a bottom view of the portion of the stylus of FIG. 22, according to some embodiments of the subject technology.
Figure 24:
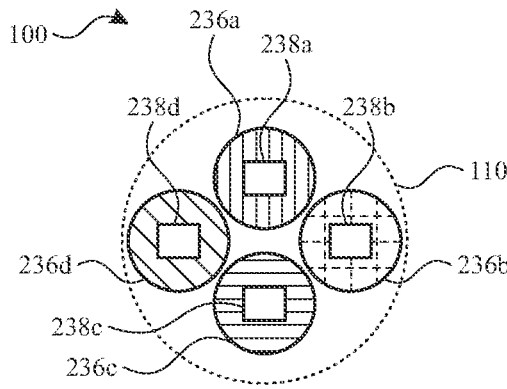
FIG. 24 illustrates a bottom view of a portion of a stylus, according to some embodiments of the subject technology.

Bristles 236a-d can be arranged in a variety of ways. In some embodiments, as shown in FIG. 23, each of bristles 236a-d can be arranged with ends aligned in a row. In some embodiments, as shown in FIG. 24, each of bristles 236a-d can be arranged with ends that are circumferentially distributed about an axis of the stylus. While only four bristles are shown, it will be understood that any number of bristles can be provided in any arrangement. While each of the bristles are shown with a corresponding electric field generator, it will be understood that additional bristles can be provided without electric field generators. With such an arrangement, the total number of bristles can provide a particular tactile experience while the electric field generators on fewer than all of the bristles can provide an estimated location of other bristles.

Figure 25:
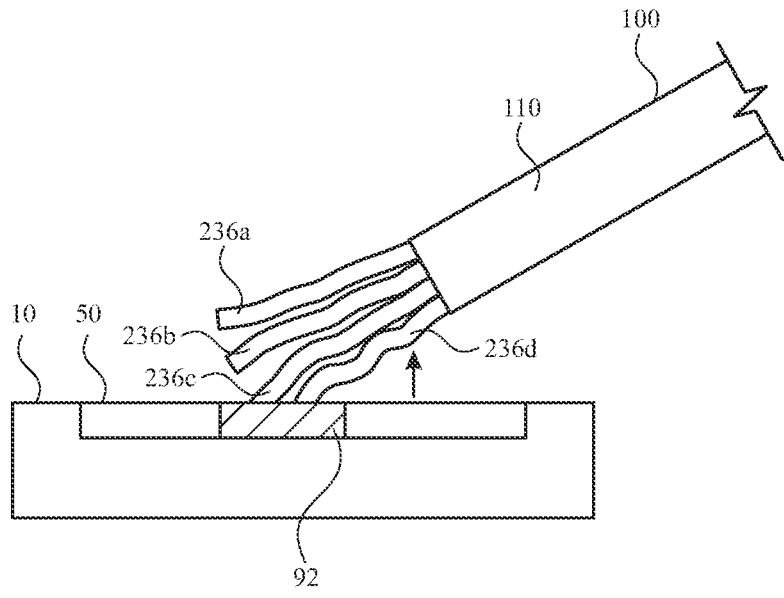
FIG. 25 illustrates a side view of a portion of a stylus and an external device, according to some embodiments of the subject technology.

The independent bristles 236a-d of stylus 100 can be used to provide a particular input from the user operating stylus 100. As shown in FIG. 25, bristles (e.g., bristles 236c-d) on one side of stylus 100 can be used to contact external device 10 at display 50 thereof. In some embodiments, display 50 can output a visual indicator 92 corresponding to a color or other feature to be assigned to the contacting bristles (e.g., bristles 236*c-d*). For example, display 50 can output multiple visual indicators 92, and the user can bring at least some of bristles 236*a-d* into contact with one or more of visual indicators 92. Thereafter, stylus 100 and/or external device 10 can record a characteristic (e.g., color, shape, thickness, etc.) corresponding to visual indicator 92 as assigned to the contacting bristles (e.g., bristles 236*c-d*). Different ones of bristles 236*a-d* can be assigned different characteristics as desired.

Figure 26:
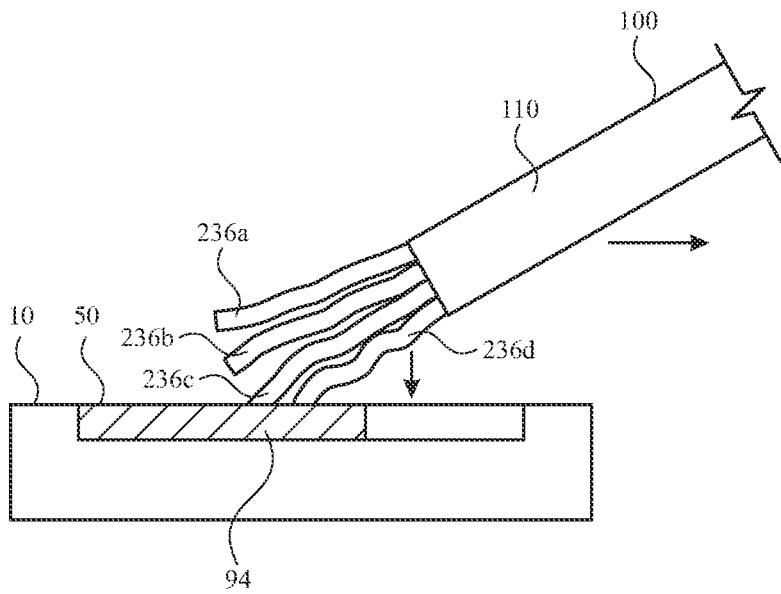
FIG. 26 illustrates a side view of the portion of the stylus and the external device of FIG. 25, according to some embodiments of the subject technology.

Thereafter, as shown in FIG. 26, bristles (e.g., bristles 236*c-d*) on one side of stylus 100 can be used to contact external device 10 at display 50 thereof. In response, display 50 can output a visual indicator 94 corresponding to a color or other feature that is known to be assigned to the contacting bristles (e.g., bristles 236*c-d*). For example, display 50 can output a line or other marking at the location of contact and having the assigned characteristic(s). The visual indicator 94 and/or multiple visual indicators 94 can have different characteristics based on the application of corresponding bristles 236*a-d*. As such, the system 2 can simulate an experience with a brush with multiple bristles having independent movement and assigned characteristics (e.g., color).

Referring now to FIGS. 27-29, a tip of a stylus can be provided with a display to output visual information to a user. In some embodiments, as shown in FIG. 27, a display 240 can be provided at tip 200 of stylus 100 to display a color or other information to a user. A displayed color can correspond to a setting of stylus 100 and/or the external device. For example, the displayed color can be a color that is to be recorded and displayed on the external device based on operation of stylus 100. By further example, display 240 can be positioned at and/or extend from at least a portion of outer body 202 of stylus 100. For example, as illustrated in FIG. 27, display 240 can be positioned between housing 110 and a terminal end of stylus 100. By further example, display 240 can be positioned between housing 110 and an end of tip 200 of stylus 100. The position of display 240 can facilitate viewing of display 240 by the user while stylus 100 is held and/or operated by the user. For example, display 240 can be positioned adjacent to, and not entirely within, a grip region of stylus 100. Accordingly, the user can easily see the color provided on display 240 while gripping and using stylus 100. Furthermore, where display 240 is near a terminal end of stylus 100 (e.g., near tip 200), stylus 100 can be used with an external device in a manner that positions display 240 of stylus 100 near interface surface of the external device. Accordingly, display 240 can show a color near the location at which a representation on the external device is generated in the same color. Thus, display 240 can act as an indicator or label for the color to be generated by operation of stylus 100.

As shown in FIG. 28, display 240 can form at least a portion of tip 200 of stylus 100. Display 240 can have a taper that is a continuation of another taper along outer body 202 (e.g., together forming tip 200). For example, display 240 and outer body 202 can each define an outer surface forming the same angle with respect to a longitudinal axis of stylus 100. Display 240 can have a shape along outer body 202 that is conical or frustoconical. Display 240 can extend entirely or partially circumferentially about the longitudinal axis of stylus 100. At least a portion of tip 200 can extend through at least a portion of display 240, for example to connect to a force sensor or other components within housing 110 of stylus 100.

As shown in FIG. 29, display 240 can emit light from within outer body 202 of tip 200. Display 240 can be aligned with corresponding openings in outer body 202. As such, outer body 202 can define an outermost periphery of tip 200. Accordingly, outer body 202 can have one or more of the features described herein to provide the desired size, shape, stiffness, and/or other characteristic. At least a portion of outer body 202 can transmit light from display 240. For example, outer body 202 can include or be optically connected to display 240. Display 240 can provide light to outer body 202, and outer body 202 can direct at least some of the light to the user. Outer body 202 can be illuminated by the light received from display 240. For example, outer body 202 can include a material that scatters, reflects, and/or diffuses at least some of the light. Accordingly, tip 200 can be illuminated or glow in a color that corresponds to the selected color.

Display 240 can be a visual output element, such as a liquid crystal display screen, electronic ink (e-ink) screen, organic light emitting diode (OLED) or diodes, light emitting diode or diodes, or the like. Where display 240 provides a curvature, such as along outer body 202 of stylus 100, a flexible OLED screen can optionally be provided to conform to the desired shape. Display 240 can include multiple light emitters, such as red, green, and blue (RGB) emitters to produce a combined color based on levels of each constituent color.

While a single tip 200 with one outer body 202 is shown in each of FIGS. 27-29, it will be understood that display 240 can be implemented on each of multiple components, where applicable. For example, display 240 can be provided on each of bristles 236*a-d* of stylus 100 of FIGS. 22-26. Where each of bristles 236*a-d* correspond to a different color to be output by external device 10, the corresponding bristles 236*a-d* can output the appropriate colors with the corresponding displays 240.

Referring now to FIGS. 30 and 31, a stylus can control a mass to alter weight distribution of the stylus and/or respond to movement of the stylus. Such controls can simulate responsiveness of a drawing or writing tool having particular characteristics.

As shown in FIG. 30, tip 200 of stylus 100 can extend from an end of housing 110 of stylus 100. Housing 110 can define axis 112. Housing 110 can further include a mass 164 that is moveable within housing 110. Mass 164 can include any structure or object that is moveable within housing 110 to alter the total weight distribution of stylus 100. It will be understood that mass 164 can optionally correspond to and/or include one or more other components of stylus 100, including electronic components (e.g., battery) that are operably connected to each other and/or one or more other components of stylus 100.

As shown in FIG. 31, stylus 100 can include an actuator 166 that is operable to move mass 164 within housing 110. For example, as shown in FIG. 31, actuator 166 can be operated to move mass 164 along and/or parallel to axis 112 of stylus 100. By moving mass 164 along axis 112, a center of mass of stylus 100 can be altered. For example, the center of mass can be shifted in a direction of movement of mass 164. It will be understood that actuator 166 can be operated to move mass 164 in any direction. For example, actuator 166 can be operated to move mass 164 parallel to and/or transverse to axis 112. By moving mass 164 and controlling the center of axis of stylus 100, stylus 100 can be modified to simulate a drawing or writing tool having particular characteristics, such as size, weight, and/or weight distribution. For example, mass 164 can be moved away from tip 200 to simulate a longer tool having a weight distribution farther away from tip 200. By further example, mass 164 can be moved toward tip 200 to simulate a shorter tool having a weight distribution closer to tip 200. By further example, mass 164 can be moved transverse to axis 112 to simulate a device that has a weight distribution that either is or is not symmetric across axis 112.

In some embodiments, actuator 166 can be operated in response to manual selection (e.g., input) from a user or automatically based on programmed parameters. The weight distribution can be altered to mimic characteristics of a particular writing or drawing tool (e.g., pen, pencil, chalk, marker, or paintbrush, etc.). Such adjustments can be made in response to a user input, a signal from the external device, and/or one or more detected conditions. For example, a stylus profile corresponding to a stylus to be simulated can be selected, and the controller and/or actuator can be operated according to parameters associated with the stylus profile.

In some embodiments, actuator 166 can be operated in response to one or more detections by sensor 128. For example, as the user moves stylus 100 in one or more directions, mass 164 can be moved to compensate for or enhance the reaction forces of such movement. In some embodiments, actuator 166 can be operated to urge stylus 100 in a particular direction to guide the user. For example, where the sensor 128 detects that stylus 100 and/or tip 200 is not in a target location, actuator 166 can be operated to urge stylus 100 toward the target location by moving mass 164.

Actuator 166 can include a motor, pump, heater, electromagnet, or other mechanism for controlling movement and position of mass 164. It will be understood that other mechanisms can be provided to alter the position of mass 164.

Referring now to FIGS. 32 and 33, a stylus can control a wheel to alter orientation and torque of the stylus and/or respond to rotation of the stylus. Such controls can simulate responsiveness of a drawing or writing tool having particular characteristics.

As shown in FIG. 32, tip 200 of stylus 100 can extend from an end of housing 110 of stylus 100. Housing 110 can further include a wheel 168 that is rotatable within housing 110. Wheel 168 can include any structure or object that is rotatable within housing 110 to alter the orientation of or torque applied by stylus 100.

As shown in FIG. 33, stylus 100 can include an actuator 170 (e.g., motor) that is operable to rotate wheel 168 within housing 110. In some embodiments, wheel 168 can be or be connected to a rotor of actuator 170. For example, as shown in FIG. 33, actuator 170 can be operated to rotate wheel 168 in a direction that is counter to a detected direction of rotation of stylus 100. By rotating wheel 168, stylus 100 can apply a torque to a user holding stylus 100. It will be understood that such torque can be counter to a torque applied to rotate wheel 168. It will be understood that actuator 170 can be operated to rotate wheel 168 in any direction. For example, actuator 170 can be operated to rotate wheel 168 about an axis that is transverse to a longitudinal axis of stylus 100.

In some embodiments, actuator 170 can be operated in response to one or more detections by sensor 128. For example, as the user rotates stylus 100 about one or more axes, wheel 168 can be rotated to compensate for or enhance the reaction torque of such rotation. By rotating wheel 168 in response to detected rotations, stylus 100 can simulate the responsiveness that a particular drawing or writing tool would provide. For example, actuator 170 can be operated to resist or enhance an applied torque so that stylus 100 responds as would a drawing or writing tool having particular characteristics, such as size, weight, and/or weight distribution. For example, wheel 168 can be rotated to simulate the responsiveness of a tool having a particular moment of inertia.

In some embodiments, actuator 170 can be operated to urge stylus 100 in a particular direction to guide the user. For example, where the sensor 128 detects that stylus 100 and/or tip 200 is not in a target location, actuator 170 can be operated to urge stylus 100 toward the target location by rotating wheel 168.

In some embodiments, actuator 170 can be operated according to parameters that are manually selected by a user or automatically selected based on programmed parameters. The rotation can be altered to mimic the moment of inertia of a particular writing or drawing tool (e.g., pen, pencil, chalk, marker, or paintbrush, etc.). Such adjustments can be made in response to a user input, a signal from the external device, and/or one or more detected conditions. For example, a stylus profile corresponding to a stylus to be simulated can be selected, and the controller and/or actuator can be operated according to parameters associated with the stylus profile.

Actuator 170 can include a motor, pump, heater, electromagnet, or other mechanism for controlling rotation and torque of wheel 168. It will be understood that other mechanisms can be provided to control the rotation of wheel 168.

While some embodiments of touch-based input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the external device can be any device that interacts with a touch-based input device. For example, an external device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

As shown, an input device, such as a stylus, can include adjustment capabilities that changes a size, shape, stiffness, or other characteristics of a portion of the stylus, such as the tip. The size, shape, stiffness, or other characteristics of a tip of the stylus can be altered to mimic characteristics of a particular writing or drawing tool. For example, the stiffness at the tip, the weight distribution, and/or moment of inertia of a particular tool can be simulated by altering the features of the stylus.

Various examples of aspects of the disclosure are described below as clauses for convenience. These are provided as examples, and do not limit the subject technology.

Clause A: a stylus comprising: a housing; a tip positioned at an end of the housing; a force sensor configured to detect a force between the tip and the housing; and an actuator configured to apply a force to the tip to control a range of available motion of the tip relative to the housing.

Clause B: a stylus comprising: a housing; multiple bristles each being independently coupled to an end of the housing, each of the bristles comprising an electric field generator;

and a controller configured to transmit signals to the electric field generators to generate electric fields based on the signals, each of the signals being modulated with an operating parameter that is different than an operating parameter of every other one of the signals.

Clause C: a stylus comprising: a housing; a wheel rotatable with respect to the housing; a sensor configured to detect an orientation of the stylus; and a motor configured to control rotation of the wheel in response to a detection of the orientation of the stylus.

One or more of the above clauses can include one or more of the features described below. It is noted that any of the following clauses can be combined in any combination with each other, and placed into a respective independent clause, e.g., clause A, B, or C.

Clause 1: the tip comprises: a rigid core; an outer body having a stiffness that is less than a stiffness of the rigid core; and a band comprising a shape-memory material and extending over the outer body, the actuator being operable to apply heat to the band, wherein the band is configured to respond to the heat by changing a shape of the band and moving the outer body the alter a stiffness of the outer body.

Clause 2: the actuator comprises an electromagnet; and the tip comprises: a rigid core; an outer body having a stiffness that is less than a stiffness of the rigid core; and a magnetorheological fluid between the rigid core and the outer body, wherein the magnetorheological fluid is configured to alter its viscosity in response to a magnetic field from the electromagnet.

Clause 3: the tip is laterally moveable with respect to a longitudinal axis of the housing in response to an external force, the tip comprising a magnet; and the actuator comprises an electromagnet configured to generate a magnetic field that attracts the magnet of the tip toward the longitudinal axis.

Clause 4: the tip is suspended with respect to the housing by springs distributed about a portion of the tip.

Clause 5: the tip is rotatable with respect to the housing in response to an external force, the tip comprising a magnet; and the actuator comprises an electromagnet configured to generate a magnetic field that applies a torque to urge the magnet toward alignment with the longitudinal axis.

Clause 6: the tip is rotatable with respect to the housing in response to an external force; the stylus further comprises a beam comprising a shape-memory polymer, the beam being configured to resist rotation of the tip away from a biased orientation with a torque that is based on a shape of the beam; and the actuator being operable to apply heat to the beam, wherein the beam is configured to respond to the heat by changing the shape of the beam.

Clause 7: the tip is rotatably coupled to the housing by a ball joint, wherein the beam extends within a channel extending through the ball joint.

Clause 8: the tip is rotatably coupled to the housing by a ball joint, wherein the beam extends about the ball joint.

Clause 9: the tip comprises: an outer body; and a compressible pillow having a stiffness that is less than a stiffness of the outer body, wherein the compressible pillow is configured to move from a retracted configuration flush with the outer body to an extended configuration protruding beyond the outer body.

Clause 10: the actuator comprises a pump configured to move a fluid into or out of the compressible pillow.

Clause 11: a modulus of elasticity of the outer body is higher than a modulus of elasticity of the compressible pillow.

Clause 12: at least some of the bristles are coupled to the housing with corresponding ends aligned in a row.

Clause 13: at least some of the bristles are coupled to the housing with corresponding ends that are circumferentially distributed about a longitudinal axis of the stylus.

Clause 14: each operating parameter is a frequency of a corresponding one of the signals.

Clause 15: a mass movable within the housing; and an actuator configured to control movement of the mass within the housing.

Clause 16: the mass is moveable along a longitudinal axis of the housing.

Clause 17: the motor is further configured to control rotation of the wheel based on a user input indicating a selection of a stylus profile.

Various processes defined herein consider the option of obtaining and utilizing a user's personal information. For example, such personal information can be utilized for spatial modeling of enclosed environments for control of acoustic components. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties can access or otherwise obtain personal information. For instance, settings or other preferences can be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

Accordingly, embodiments of the subject technology described herein provide for a vehicle with a seat assembly that provides an ability for the seat to rotate about an axis within each front and rear ranges. When the seat is moved to a transition range, circumferentially between the front and rear ranges, an actuator can be operated to apply a torque and assist with transition to the other range. Other structures can move to facilitate the transition of the seat. The seat assembly can also have locked positions, in which the seat is limited in its rotation. Such dynamic adjustment capabilities allow the seat to provide flexibility and stability as needed based on the applicable conditions.

It is understood that any specific order or hierarchy of blocks in the processes disclosed is an illustration of example approaches. Based upon design preferences, it is understood that the specific order or hierarchy of blocks in the processes can be rearranged, or that all illustrated blocks be performed. Any of the blocks can be performed simultaneously. In one or more embodiments, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component can also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an embodiment, the embodiment, another embodiment, some embodiments, one or more embodiments, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) can apply to all configurations, or one or more configurations. A disclosure relating to such phrase(s) can provide one or more examples. A phrase such as an aspect or some aspects can refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neutral gender (e.g., her and its) and vice versa. Headings and subheadings, if any, are used for convenience only and do not limit the subject disclosure.

What is claimed is:

1. A stylus comprising:
a housing;
a tip positioned at an end of the housing, the tip comprising:
  a first portion including an outer body; and
  a second portion including multiple compressible pillows distributed longitudinally and circumferentially about the outer body;
a force sensor configured to detect a force between the tip and the housing; and
an actuator configured to apply a force to the tip to move the first portion of the tip relative to the second portion of the tip.

2. The stylus of claim 1, wherein:
the first portion of the tip includes an outer body; and
the second portion of the tip includes a compressible pillow having a stiffness that is less than a stiffness of the outer body, wherein the actuator is configured to move the compressible pillow from a retracted configuration flush with the outer body to an extended configuration protruding beyond the outer body.

3. The stylus of claim 1, wherein a modulus of elasticity of the first portion is higher than a modulus of elasticity of the second portion.

4. The stylus of claim 1, further comprising a band, wherein:
the tip comprises a rigid core;
the outer body having a stiffness that is less than a stiffness of the rigid core; and
the band comprises a shape-memory material and extending over the outer body,
the actuator being operable to apply heat to the band, wherein the band is configured to respond to the heat by changing a shape of the band and moving the outer body to alter the stiffness of the outer body.

5. The stylus of claim 1, wherein:
the actuator comprises an electromagnet; and
the tip comprises:
  a rigid core; and
  a magnetorheological fluid between the rigid core and the outer body, wherein the magnetorheological fluid is configured to alter its viscosity in response to a magnetic field from the electromagnet.

6. The stylus of claim 1, wherein:

the tip is laterally moveable with respect to a longitudinal axis of the housing in response to an external force, the tip comprising a magnet, and the actuator comprises an electromagnet configured to generate a magnetic field that attracts the magnet of the tip toward the longitudinal axis.

7. The stylus of claim 6, wherein the tip is suspended with respect to the housing by springs distributed about a portion of the tip.

8. The stylus of claim 1, wherein:

the tip is rotatable with respect to the housing in response to an external force, the tip comprising a magnet, and the actuator comprises an electromagnet configured to generate a magnetic field that applies a torque to urge the magnet toward alignment with a longitudinal axis of the housing.

9. The stylus of claim 1, wherein:

the tip is rotatable with respect to the housing in response to an external force, the stylus further comprises a beam comprising a shape-memory polymer, the beam being configured to resist rotation of the tip away from a biased orientation with a torque that is based on a shape of the beam, and the actuator being operable to apply heat to the beam, wherein the beam is configured to respond to the heat by changing the shape of the beam.

10. The stylus of claim 9, wherein the tip is rotatably coupled to the housing by a ball joint, wherein the beam extends within a channel extending through the ball joint.

\* \* \* \* \*